(12) United States Patent
Yadav et al.

(10) Patent No.: US 10,613,893 B2
(45) Date of Patent: Apr. 7, 2020

(54) SYSTEM AND METHOD FOR REDUCING DOWNTIME DURING HYPERVISOR CONVERSION

(71) Applicant: Nutanix, Inc., San Jose, CA (US)

(72) Inventors: Pulkit Yadav, Bangalore (IN); Sudish Kumar Sah, Bangalore (IN); Supreeth Srinivasan, Bengaluru (IN); Raghu Prasad Rapole, Telangana (IN); Anil Kumar Boggarapu, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 19 days.

(21) Appl. No.: 15/887,331

(22) Filed: Feb. 2, 2018

(65) Prior Publication Data

US 2019/0243672 A1    Aug. 8, 2019

(51) Int. Cl.
*G06F 9/455* (2018.01)
*G06F 3/06* (2006.01)

(52) U.S. Cl.
CPC ........ *G06F 9/45558* (2013.01); *G06F 3/0617* (2013.01); *G06F 2009/4557* (2013.01); *G06F 2009/45562* (2013.01)

(58) Field of Classification Search
CPC .................................................. G06F 9/45533
USPC .............................................................. 718/1
See application file for complete search history.

(56) References Cited

U.S. PATENT DOCUMENTS

| | | |
|---|---|---|
| 8,352,608 B1 | 1/2013 | Keagy et al. |
| 8,549,518 B1 | 10/2013 | Aron et al. |
| 8,601,473 B1 * | 12/2013 | Aron ................ G06F 9/45533 718/1 |
| 8,850,130 B1 | 9/2014 | Aron et al. |
| 9,396,004 B1 | 7/2016 | Bester et al. |
| 9,424,062 B1 | 8/2016 | Mummidi et al. |
| 9,672,060 B2 | 6/2017 | Behere et al. |
| 9,772,866 B1 | 9/2017 | Aron et al. |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Mehram Kamran
(74) *Attorney, Agent, or Firm* — Foley & Lardner LLP

(57) ABSTRACT

A system and method include receiving, by a migration tool of a virtual computing system, an indication for hypervisor conversion for converting a hypervisor on nodes in a cluster of the virtual computing system from a first hypervisor type to a second hypervisor type. The system and method also include converting, one at a time, the hypervisor on each of the nodes from the first hypervisor type to the second hypervisor type in response to the indication, including converting virtual machines on each of the nodes for running on the second hypervisor type. The hypervisor and the virtual machines are converted on one node before starting conversion of the hypervisor and the virtual machines on another node, and the virtual machines of the one node are migrated from the one node before conversion and the migrated virtual machines remain operational during conversion of the hypervisor on the one node.

24 Claims, 11 Drawing Sheets

(56) References Cited

U.S. PATENT DOCUMENTS

| | | | |
|---|---|---|---|
| 2005/0268298 A1* | 12/2005 | Hunt | G06F 9/4856 718/1 |
| 2009/0055507 A1 | 2/2009 | Oeda | |
| 2013/0139154 A1* | 5/2013 | Shah | G06F 9/45558 718/1 |
| 2013/0139155 A1* | 5/2013 | Shah | G06F 9/45558 718/1 |
| 2014/0229944 A1 | 8/2014 | Wang et al. | |
| 2015/0234611 A1* | 8/2015 | Mutalik | G06F 11/1446 711/114 |
| 2015/0324216 A1* | 11/2015 | Sizemore | G06F 9/45558 718/1 |
| 2015/0324217 A1* | 11/2015 | Shilmover | G06F 9/45558 718/1 |
| 2015/0358404 A1* | 12/2015 | Ayanam | G06F 9/4856 709/203 |
| 2016/0019053 A1* | 1/2016 | Gambardella | H04L 65/80 717/172 |
| 2016/0062779 A1* | 3/2016 | Tsirkin | G06F 9/45558 718/1 |
| 2016/0203014 A1 | 7/2016 | Gschwind et al. | |
| 2016/0306648 A1* | 10/2016 | Deguillard | G06F 9/45558 |
| 2016/0306649 A1* | 10/2016 | Gunti | G06F 9/45558 |
| 2016/0335109 A1* | 11/2016 | Ryu | G06F 9/45558 |
| 2016/0378547 A1* | 12/2016 | Brouwer | G06F 9/4856 718/1 |
| 2017/0168903 A1* | 6/2017 | Dornemann | G06F 9/45558 |
| 2017/0289002 A1* | 10/2017 | Ganguli | H04L 43/0876 |
| 2017/0371691 A1* | 12/2017 | Gunti | G06F 9/45558 |
| 2018/0060057 A1* | 3/2018 | Dake | G06F 8/65 |
| 2018/0241617 A1* | 8/2018 | Radzikowski | H04L 41/082 |
| 2018/0329737 A1* | 11/2018 | Dong | G06F 9/45558 |
| 2019/0034240 A1* | 1/2019 | Nabi | H04L 41/5041 |
| 2019/0079790 A1* | 3/2019 | Tagashira | G06F 9/45558 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD FOR REDUCING DOWNTIME DURING HYPERVISOR CONVERSION

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, the hypervisor needs to be converted from one type to another. Hypervisor conversion entails reconfiguration of several other components, including reconfiguration of virtual machines, on the host machines. However, the present day mechanism for converting hypervisors has limitations due to the configuration of the virtual computing systems and the way they operate.

SUMMARY

In accordance with at least some aspects of the present disclosure, a method is disclosed. The method includes receiving, by a migration tool of a virtual computing system, an indication for hypervisor conversion for converting a hypervisor on nodes in a cluster of the virtual computing system from a first hypervisor type to a second hypervisor type. The method also includes converting, by the migration tool, one at a time, the hypervisor on each of the nodes from the first hypervisor type to the second hypervisor type in response to the indication, including converting, by the migration tool, virtual machines on each of the nodes for running on the second hypervisor type. The hypervisor and the virtual machines are converted on one node before starting conversion of the hypervisor and the virtual machines on another node and the virtual machines of the one node undergoing the conversion are migrated from the one node before conversion of the hypervisor on the one node and the migrated virtual machines remain operational during conversion of the hypervisor on the one node.

In accordance with another aspect of the present disclosure, another method is disclosed. The method includes receiving, by a migration tool of a virtual computing system, an indication for hypervisor conversion for converting a hypervisor on nodes in a cluster of the virtual computing system from a first hypervisor type to a second hypervisor type. Each of the nodes runs an instance of the first hypervisor type before the hypervisor conversion and an instance of the second hypervisor type after the hypervisor conversion, the nodes include a first set of nodes and a last node, each of the first set of nodes and the last node includes one or more virtual machines, and the hypervisor conversion on each of the first set of nodes to the second hypervisor type is performed before the hypervisor conversion on the last node. The method also includes performing, by the migration tool, the hypervisor conversion one at a time of each of the first set of nodes, such that the hypervisor conversion of a first node of the first set of nodes includes converting, by the migration tool, the hypervisor on the first node to the second hypervisor type before converting, by the migration tool, the one or more virtual machines on the first node for running on the second hypervisor type. The method further includes performing, by the migration tool, the hypervisor conversion of the last node by converting the one or more virtual machines on the last node for running on the second hypervisor type before converting the hypervisor on the last node to the second hypervisor type. The one or more virtual machines on the first set of nodes and the last node remain turned on during the conversion of the hypervisor on each of the first set of nodes and the last node to the second hypervisor type.

In accordance with some other aspects of the present disclosure, a system is disclosed. The system includes a migration tool in a virtual computing system. The migration tool includes a hypervisor conversion system configured to convert a hypervisor on each of a plurality of nodes of a cluster in the virtual computing system from a first hypervisor type to a second hypervisor type and a virtual machine conversion system configured to convert virtual machines on each of the plurality of nodes for running on the second hypervisor type. The hypervisor and the virtual machines are converted on a first one of the plurality of nodes before the hypervisor and the virtual machines on a second one of the plurality of nodes, and the virtual machines on the first one of the plurality of nodes remain turned on while converting the hypervisor on the first one of the plurality of nodes.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
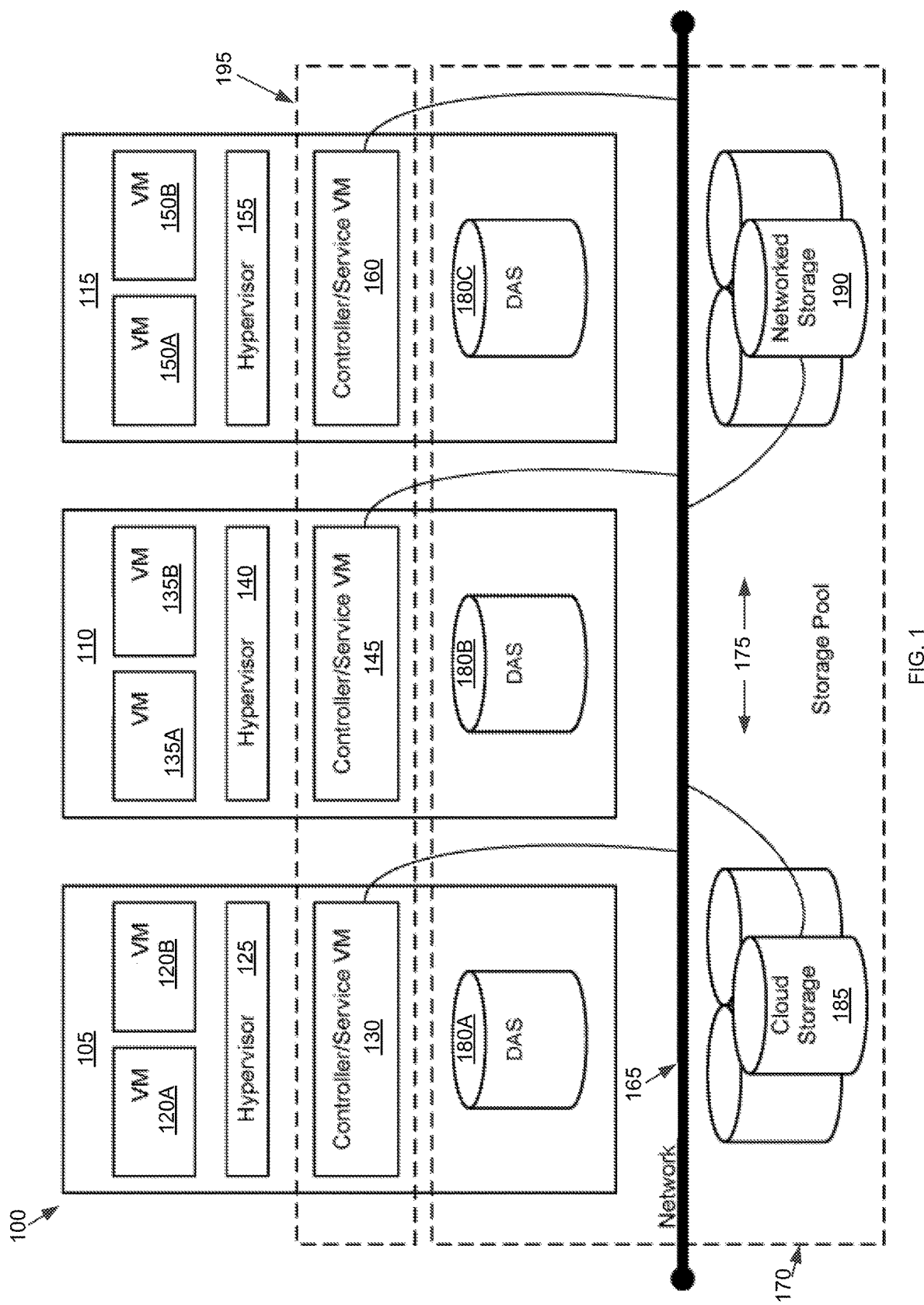
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. Occasionally, the hypervisor on the plurality of nodes within a particular cluster may need to be converted. For example, in some embodiments, the hypervisor may be converted from a first hypervisor type to a second hypervisor type. In some embodiments, the first hypervisor type may be an ESXi type of hypervisor provided by VMware and the second hypervisor type may be an AHV type of hypervisor provided by Nutanix, Inc. In other embodiments, the first hypervisor type may be AHV and the second hypervisor type may be ESXi. In yet other embodiments, the first and second hypervisor types may be any other types of hypervisors.

Converting a hypervisor from the first hypervisor type to the second hypervisor type also entails converting the underlying virtual machines on a given node. Specifically, each virtual machine on a node is configured and optimized for running on the hypervisor type that is provided on that node. Thus, in addition to converting the hypervisor from the first hypervisor type to the second hypervisor type, the underlying virtual machines are also converted for running from the first hypervisor type to running on the second hypervisor type.

Conventionally, hypervisor and virtual machine conversion is performed by turning off all virtual machines on all of the nodes within the cluster being converted. Upon turning off the virtual machines, each node is converted one at a time from the first hypervisor type to the second hypervisor type. Each node conversion from the first hypervisor type to the second hypervisor type may take at least thirty minutes. Depending upon the number of nodes within the cluster being converted, the total time to convert all of the nodes within the cluster from the first hypervisor type to the second hypervisor type may be of the order of several hours. During this entire process, the virtual machines remain turned off.

Once all of the nodes have been successfully converted from the first hypervisor type to the second hypervisor type, the virtual machines are turned on, reconfigured, and resume operation. During the time that the virtual machines are turned off, those virtual machines are not operational and any existing workload on those virtual machines is halted. Depending upon the number of nodes in the cluster, the downtime of the virtual machines when the virtual machines are turned off may be quite significant. For example, for a cluster having three nodes, the virtual machines within the cluster may each incur a downtime of at least one and a half hours (assuming each node takes only thirty minutes to convert). This significant downtime of the virtual machines requires scheduling conversion of the nodes from the first hypervisor type to the second hypervisor type at specific "maintenance" times, which may not particularly be convenient.

Regardless of the inconvenience of scheduling the conversion, the operation of the virtual machines greatly suffers. Since the virtual machines are inoperable during the conversion, the performance of the virtual machines greatly suffers and prevents the virtual machines from performing their intended tasks. Thus, a technical problem currently exists in which the virtual machines on the nodes of a cluster are prevented from operating at their full capacity during the conversion from the first hypervisor type to the second hypervisor type.

Further, users may be significantly inconvenienced due to the conversion, not just due to the great downtime of the virtual machines during conversion, but also because of having to manually reconfigure several settings of the virtual machines after the conversion. For example, using conventional conversion techniques, after the conversion from the first hypervisor type to the second hypervisor type, users have to manually reconfigure the virtual machines for running on the second hypervisor type. The manual reconfiguration is cumbersome, prone to errors, and further increases the downtime of the virtual machines. Accordingly, another technical problem currently exists of reconfiguring the virtual machines after the conversion from the first hypervisor type to the second hypervisor type.

The present disclosure provides solutions. For example, the present disclosure provides a migration tool that facilitates conversion of the hypervisor and virtual machines from a first hypervisor type to a second hypervisor type while significantly reducing the downtime of the virtual machines from several hours of the conventional techniques to the order of minutes (e.g., one or two minutes per virtual machine). Specifically, the migration tool facilitates conversion such that only the virtual machines of the converting node are impacted and that too only for a short period of time. The virtual machines on the other nodes of the cluster that are currently not undergoing the conversion from the first hypervisor type to the second hypervisor type continue normal operation. The virtual machines on the node undergoing the conversion also continue normal operation for a significant portion of the conversion process.

Further, the migration tool provides a mechanism for capturing the configuration parameters of the virtual machines before the conversion from the first hypervisor type to the second hypervisor type. After the conversion, the previously captured configuration parameters are automatically reattached to the virtual machines, thereby not requiring any user intervention.

The migration tool facilitates the conversion from the first hypervisor type to the second hypervisor type one node at a time. The virtual machines of the node currently undergoing the conversion are migrated to another node within the cluster having the same hypervisor type. Since the virtual machines are migrated to another node having the same hypervisor type, the virtual machines need not be turned off and may continue operation during and after the migration to the another node. Upon the virtual machines migration, the node undergoing the conversion is converted from the first hypervisor type to the second hypervisor type. Upon successfully converting to the second hypervisor type, the migrated virtual machines are also converted for running on the second hypervisor type and migrated back one by one to the node undergoing the conversion.

Thus, the present disclosure provides an easy, time saving, and automatic process for converting the hypervisor from the first hypervisor type to the second hypervisor type.

Referring now to FIG. 1, a virtual computing system 100 is shown, in accordance with some embodiments of the present disclosure. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, respectively, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, as discussed below, in some embodiments, the local management system of the controller/service VM 130, the controller/service VM 145, and the controller/service VM 160 may facilitate conversion of the hypervisor 125, the hypervisor 140, and the hypervisor 155 from a first hypervisor type to a second hypervisor type. The local management system may also manage the reconfiguration of the other components due to the conversion of the hypervisor.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Further, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
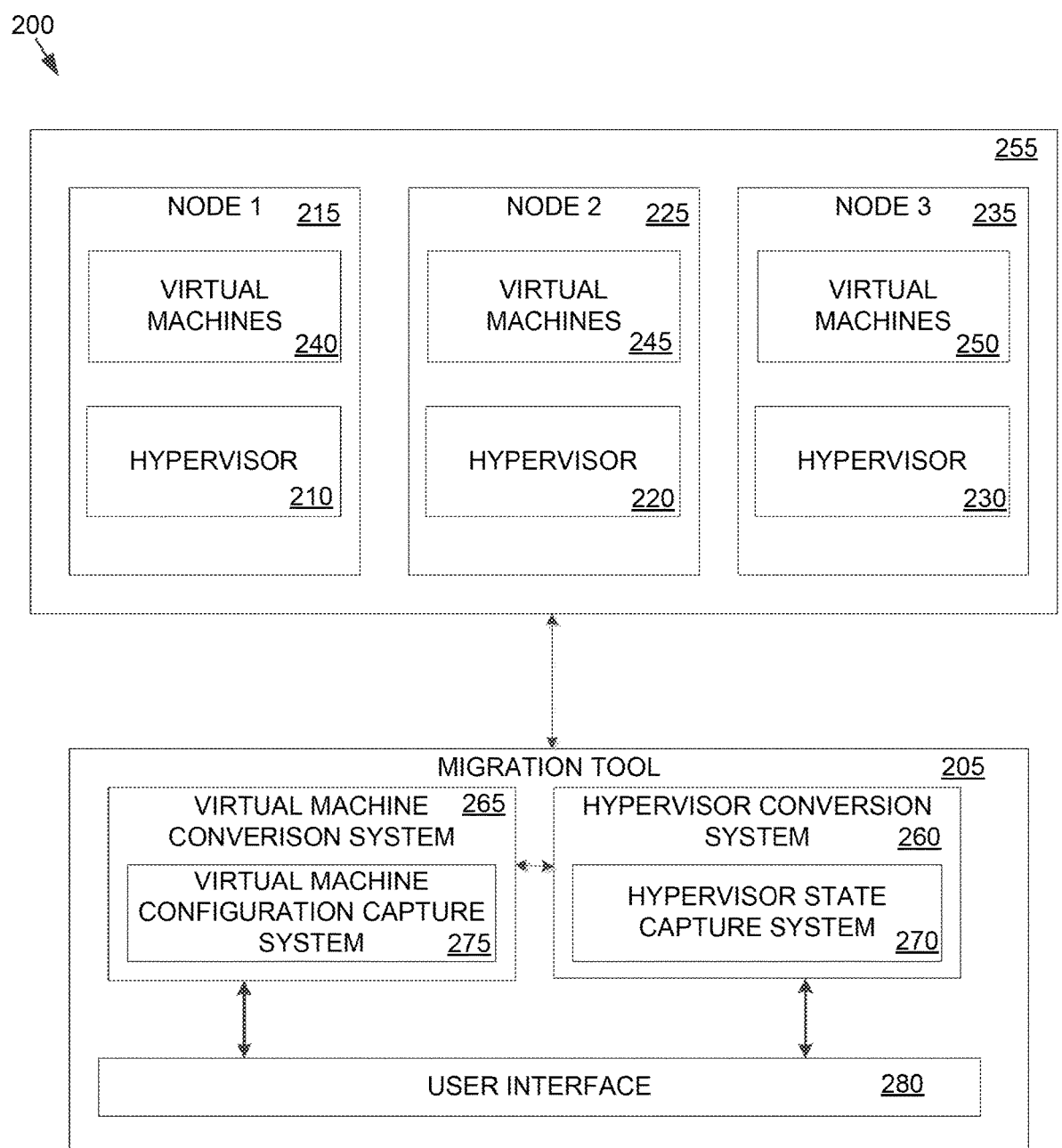
FIG. 2 is a block diagram of a conversion system of the virtual computing system of FIG. 1, in accordance with some embodiments of the present disclosure.

Turning to FIG. 2, a block diagram of a conversion system 200 is shown, in accordance with some embodiments of the present disclosure. The conversion system 200 is used to convert from a first hypervisor type to a second hypervisor type. For example, in some embodiments, the conversion system 200 is used to convert between an ESXi hypervisor and an AHV hypervisor. In other embodiments, the first hypervisor type and the second hypervisor type may be other types of hypervisors. The conversion system 200 is also used to convert the virtual machines initially running on the first hypervisor type to run on the second hypervisor type. For example, in those embodiments in which the conversion system 200 converts the ESXi hypervisor to the AHV hypervisor, the conversion system also converts the virtual machines running on the ESXi hypervisor to run on the AHV hypervisor. Similarly, when the conversion system 200 converts from the AHV hypervisor to the ESXi hypervisor, the conversion system also converts the virtual machines running on the AHV hypervisor to run on the ESXi hypervisor. Thus, along with converting a hypervisor from the first hypervisor type to the second hypervisor type, the conversion system 200 also converts the underlying virtual machines from running on the first hypervisor type to running on the second hypervisor type.

Additionally, the conversion system 200 facilitates the conversion of the hypervisor and the virtual machines such that a downtime of the virtual machines during the conversion is significantly reduced. For example, as discussed above, conventional mechanisms entail a downtime of several hours during conversion of the hypervisor and virtual machines. The conversion system 200 facilitates the conversion of the hypervisor and the virtual machines with a downtime of the order of a few minutes (e.g., a downtime of 1-2 minutes per virtual machine). By reducing the downtime of the virtual machines, the present disclosure optimizes the functioning of the virtual machines and increases user satisfaction.

To facilitate the conversion of the hypervisor from the first hypervisor type to the second hypervisor type, the conversion system 200 includes a migration tool 205. The migration tool 205 also facilitates the conversion of the virtual machines from running on the first hypervisor type to running on the second hypervisor type. "Conversion" of the hypervisor (or like terms such as "converting" of the hypervisor, etc.) as used herein means uninstalling a first hypervisor type from a node (e.g., the first node 105, the second node 110, the third node 115) of a virtual computing system (e.g., the virtual computing system 100) and installing a second hypervisor type on that node. Simply as an example and without any intentions to be limiting in any way, the present disclosure is described with respect to converting from the first hypervisor type, which is an ESXi type of hypervisor, to the second hypervisor type, which is an AHV type of hypervisor.

"Conversion" of a virtual machine (or like terms such as "converting" of the virtual machines, etc.) as used herein means optimizing the virtual machine to run on the underlying hypervisor. In some embodiments, the "conversion" may entail optimizing or changing certain configurations of the virtual machines. For example, in some embodiments, when converting from the first hypervisor type to the second hypervisor type, the data of the virtual machine may be converted from a format suitable for the first hypervisor type to a format that is suitable for the second hypervisor type. Other similar modifications may be made to the virtual machines to allow those virtual machines to run on the second type of hypervisor.

In some embodiments, the migration tool 205 may be part of the controller/service VM (e.g., the controller/service VM 130, the controller/service VM 145, the controller/service VM 160). Specifically, when part of the controller/service VM (e.g., the controller/service VM 130, the controller/service VM 145, the controller/service VM 160), the migration tool 205 may reside within the local management system (e.g., Prism Element) of the controller/service VM. Further, in some embodiments, an instance of the migration tool 205 may be located on the controller/service VM of each node (e.g., the first node 105, the second node 110, and the third node 115), but the migration tool on the leader node may facilitate the conversion of the hypervisor and the virtual machines. In other embodiments, the migration tool 205 that is located on a node other than the leader node may be designated to facilitate the conversion of the hypervisor and the virtual machines. In other embodiments, the migration tool 205 may be located on the central management system (e.g., Prism Central) that manages each of the clusters of the virtual computing system (e.g., the virtual computing system 100). In yet other embodiments, the migration tool 205 may be part of another component within or associated with the virtual computing system (e.g., the virtual computing system 100). Thus, the location of the migration tool 205 within the virtual computing system may vary from one embodiment to another.

Further, although not shown, the migration tool 205 may be configured as hardware, software, firmware, or a combination thereof. Specifically, the migration tool 205 may include one or more processing units configured to execute instructions and one or more memory units to store those instructions and other conversion related data. In some embodiments, the migration tool 205 may be connected to a storage pool (e.g., the storage pool 170) to receive, send, and process information, and to control the operations of the conversion. The instructions may be carried out by a special purpose computer, logic circuits, or hardware circuits of the migration tool 205. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory associated with the migration tool in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

Further, the migration tool 205 is configured to convert one node at a time. In other words, the migration tool 205 is configured to finish conversion of the hypervisor (and associated virtual machines) from the first hypervisor type to the second hypervisor type on one node before starting conversion of the hypervisor (and associated virtual machines) from the first hypervisor type to the second hypervisor type on another node.

For example, the migration tool 205 may be configured to convert a hypervisor 210 on a first node 215, a hypervisor 220 on a second node 225, and a hypervisor 230 on a third node 235, from the first hypervisor type to the second hypervisor type one at a time. The migration tool 205 may also be configured to convert virtual machines 240 on the first node 215, virtual machines 245 on the second node 225, and virtual machines 250 on the third node 235 for running from the first hypervisor type to the second hypervisor type. Thus, for example, the migration tool 205 may be configured to complete conversion of the hypervisor 210 and the virtual machines 240 from the first hypervisor type to the second hypervisor type on the first node 215 before starting the conversion on the second node 225 and the third node 235.

The first node 215, the second node 225, and the third node 235 are analogous to the first node 105, the second node 110, and the third node 115, respectively, discussed with respect to FIG. 1 above. Although each of the first node 215, the second node 225, and the third node 235 have been shown as having only their respective hypervisors (e.g., the hypervisor 210, the hypervisor 220, and the hypervisor 230, respectively) and their respective virtual machines (e.g., the virtual machines 240, the virtual machines 245, and the virtual machines 250, respectively), each of the first node, the second node, and the third node have additional components (e.g., the controller/service VM), as discussed above. Further, the number of the virtual machines 240, the virtual machines 245, and the virtual machines 250 on each of the first node 215, the second node 225, and the third node 235, respectively, may vary from one another, as also discussed above. Further, when the migration tool 205 is part of the controller/service VM (e.g., the controller/service VM 130, 145, 160), the migration tool may be located within one or more of the first node 215, the second node 225, and the third node 235 of a cluster 255.

While only three of the nodes (e.g., the first node 215, the second node 225, and the third node 235) are shown in FIG. 2 within the cluster 255, in other embodiments, the number of nodes within the cluster may vary from fewer than three to greater than three. In some embodiments, the migration tool 205 is configured to convert all of the nodes (e.g., the first node 215, the second node 225, and the third node 235) within the cluster 255 from the first hypervisor type to the second hypervisor type. In other embodiments, the migration tool 205 may be configured to convert a subset of the nodes (e.g., a subset of the first node 215, the second node 225, and the third node 235) from the first hypervisor type to the second hypervisor type. In such cases, the cluster 255 may include a first subset of nodes (e.g., the nodes that were not converted) having the first hypervisor type and a second subset of nodes (e.g., the nodes that were converted) having the second hypervisor type.

Thus, before conversion from the first hypervisor type to the second hypervisor type, each of the hypervisor 210, the hypervisor 220, and the hypervisor 230 (or the hypervisors that are being converted) have the first hypervisor type (e.g., ESXi) and after conversion, each of those hypervisors have the second hypervisor type (e.g., AHV). The order in which the hypervisor 210, the hypervisor 220, and the hypervisor 230 are converted may vary from one embodiment to another.

For example, in some embodiments, an order of conversion may be pre-determined. The pre-determined order may be programmed within the migration tool 205. In other embodiments, the order of conversion may not be pre-determined. Rather, the order of conversion may be determined when a request for hypervisor conversion is received. In such cases, one or more factors may be considered when determining the order of conversion. For example, the workloads of the virtual machines (e.g., the virtual machines 240, the virtual machines 245, and the virtual machines 250) may be taken into account when deciding the order of conversion, such that the hypervisor of the virtual machines having a relatively lighter workload is converted before the hypervisor of the virtual machines having a higher workload, or vice-versa. Additional or other considerations may be taken into account when deciding the order of conversion that is not pre-determined. Additionally, in some embodiments, the migration tool 205 may determine the order of conversion, while in other embodiments, the order of conversion may be determined by another component of the conversion system 200 and input into the migration tool. Other mechanisms of identifying the order of conversion may be used in other embodiments as well.

Referring still to FIG. 2, the migration tool 205 includes a plurality of components for facilitating the conversion of the hypervisor 210, the hypervisor 220, and the hypervisor 230 (and conversion of the virtual machines 240, the virtual machines 245, and the virtual machines 250, respectively). For example, the migration tool 205 includes a hypervisor conversion system 260 to convert the hypervisor 210, the hypervisor 220, and the hypervisor 230 from the first hypervisor type to the second hypervisor type, and a virtual machine conversion system 265 to convert the virtual machines 240, the virtual machines 245, and the virtual machines 250 for running from the first hypervisor type to the second hypervisor type. Although the hypervisor conversion system 260 and the virtual machine conversion system 265 are shown as separate components, in some embodiments, the hypervisor conversion system and the virtual machine conversion system may be combined into a single component. Also, similar to the migration tool 205, the hypervisor conversion system 260 and the virtual machine conversion system 265 may be configured as hardware, software, firmware, or a combination thereof having one or more processing units configured to execute instructions for converting the hypervisor 210, the hypervisor 220, and the hypervisor 230 and the virtual machines 240, the virtual machines 245, and the virtual machines 250.

The hypervisor conversion system 260 may include a hypervisor state capture system 270 that is configured to capture an existing state of the hypervisor before conversion from the first hypervisor type to the second hypervisor type. Thus, the hypervisor state capture system 270 is configured to capture the current state of the first hypervisor type at the time of conversion from the first hypervisor type to the second hypervisor type. "State" of the hypervisor as used herein means the configuration (e.g., name, settings, number and type of processing units, amount of memory, number and configuration of virtual machines, etc.) of the hypervisor. The migration tool 205 also allows for a reverse conversion from the second hypervisor type back to the first hypervisor type. By capturing the existing state of the first hypervisor type, during reverse conversion, the hypervisor state capture system 270 may return the hypervisor back to the exact state before the conversion from the first hypervisor type, thereby minimizing impact from the conversion. Although the hypervisor state capture system 270 has been shown as being part of the hypervisor conversion system 260, in other embodiments, the hypervisor state capture system may be separate from the hypervisor conversion system.

The virtual machine conversion system 265 includes a virtual machine configuration capture system 275. The virtual machine configuration capture system 275 is used to capture the state of the virtual machines (e.g., the virtual machines 240, the virtual machines 245, and the virtual machines 250) before converting those virtual machines for running from the first hypervisor type to the second hypervisor type. The virtual machine configuration capture system 275 may capture configurations such as name of the virtual machines, number of processing units, amount of memory, data, network settings, etc. The virtual machine conversion system 265 may use the information captured by the virtual machine configuration capture system 275 for migrating the virtual machines (e.g., the virtual machines 240, the virtual machines 245, and the virtual machines 250) from one node to another node in the cluster 255 in preparation for conversion. Also, although the virtual machine configuration capture system 275 has been shown as being a part of the virtual machine conversion system 265, in other embodiments, the virtual machine configuration capture system may be separate from the virtual machine conversion system.

The migration tool 205 also includes a user interface 280. The user interface 280 is used to receive an input or hypervisor conversion indication from a user to convert from the first hypervisor type to the second hypervisor type. The user interface 280 may present one or more displays to the user presenting an option (e.g., as a menu item) to convert the hypervisor (e.g., the hypervisor 210, the hypervisor 220, and the hypervisor 230) from the first hypervisor type to the second hypervisor type. The user may interact with the option to start the conversion process. Upon receiving the indication (e.g., input) from the user to start the conversion process, the user interface 280 may send an indication to the hypervisor conversion system 260 and/or the virtual machine conversion system 265. In response to receiving the indication from the user interface 280, the hypervisor conversion system 260 and the virtual machine conversion system 265 start the process for converting the hypervisor (e.g., the hypervisor 210, the hypervisor 220, and the hypervisor 230) from the first hypervisor type to the second hypervisor type, as well as converting the virtual machines (e.g., the virtual machines 240, the virtual machines 245, and the virtual machines 250) for running from the first hypervisor type to the second hypervisor type.

In those embodiments in which the migration tool 205 is configured to convert only a subset of the nodes (e.g., a subset of the first node 215, the second node 225, and the third node 235) from the first hypervisor type to the second hypervisor type, upon receiving an indication for starting the hypervisor conversion from the user, the user interface 280 may present an additional interface to the user asking for a selection of the nodes (e.g., the first node 215, the second node 225, and the third node 235) to be converted. The user interface 280 may then transmit the identity of which nodes (e.g., the first node 215, the second node 225, and the third node 235) to be converted to the hypervisor conversion system 260 and/or the virtual machine conversion system 265, which then convert only the hypervisors (e.g., the hypervisor 210, the hypervisor 220, and the hypervisor 230) and virtual machines (e.g., the virtual machines 240, the virtual machines 245, and the virtual machines 250) of the identified nodes (e.g., the identified subset of the first node 215, the second node 225, and the third node 235) from the first hypervisor type to the second hypervisor type.

The process of converting all of the nodes (e.g., the first node 215, the second node 225, and the third node 235) or a subset of the nodes (e.g., a subset of the first node 215, the second node 225, and the third node 235) within the cluster 255 from the first hypervisor type to the second hypervisor type is generally the same, as explained in greater detail below.

It is to be understood that only some components of the migration tool 205 are shown and described herein. Nevertheless, other components that are considered desirable or needed to perform the functions described herein are contemplated and considered within the scope of the present disclosure.

Figure 3:
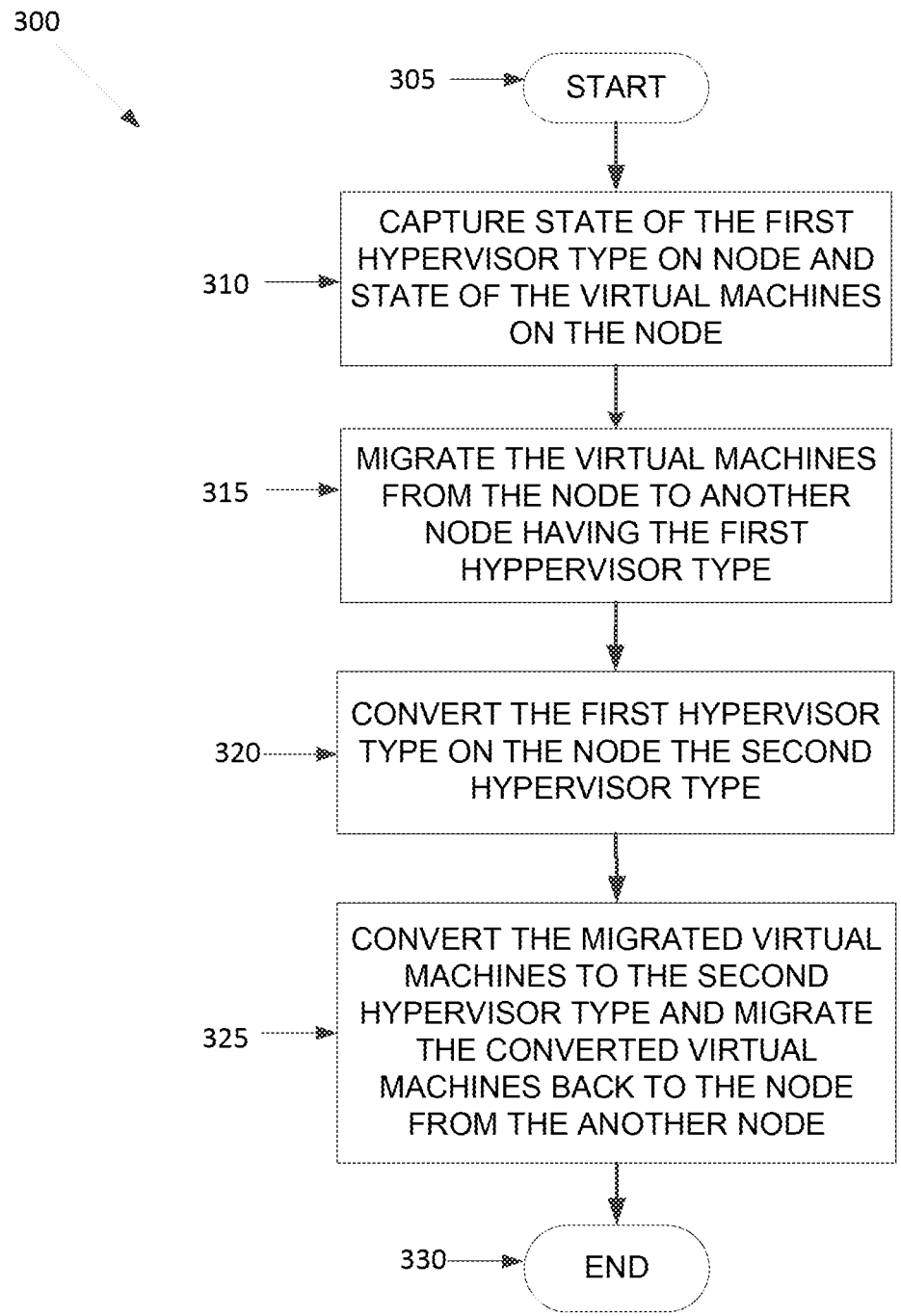
FIG. 3 is an example flowchart outlining operations for converting from a first hypervisor type to a second hypervisor type on all nodes except a last node in a cluster of the virtual computing system of FIG. 1, in accordance with some embodiments of the present disclosure.

Turning now to FIG. 3, a flowchart outlining a process 300 for converting hypervisors is shown, in accordance with some embodiments of the present disclosure. The process 300 may include additional, fewer, or different operations, depending on the particular embodiment. Further, the process 300 is described in conjunction with FIG. 2. Thus, the process 300 is used for converting at least some of the first node 215, the second node 225, and the third node 235 in the cluster 255 from a first hypervisor type (e.g., ESXi) to a second hypervisor type (e.g., AHV). Further, the process 300 is described with the order of conversion in which the first node 215 is converted first followed by the second node 225 and the third node 235 is converted last.

Furthermore, the process 300 is used for converting all nodes except a last node in the cluster 255 from the first hypervisor type to the second hypervisor type. Thus, the process 300 is used for converting the first node 215 and the second node 225 from the first hypervisor type to the second hypervisor type. The last node to be converted (e.g., the third node 235) in the cluster 255 is converted according to operations described in FIG. 4 below.

The process 300 starts at operation 305 with the hypervisor conversion system 260 and the virtual machine conversion system 265 of the migration tool 205 receiving a user request via the user interface 280 for converting the cluster 255 from the first hypervisor type to the second hypervisor type. The manner in which the hypervisor conversion system 260 and the virtual machine conversion system 265 receive the user request from the user interface 280 may vary from one embodiment to another. For example, in some embodiments, the hypervisor conversion system 260 may receive the user request from the user interface 280, and the hypervisor conversion system may notify the virtual machine conversion system of the user request. In other embodiments, other mechanisms may be used.

Additionally, upon receiving the user request for converting the cluster 255 from the first hypervisor type to the second hypervisor type, the hypervisor conversion system 260 and/or the virtual machine conversion system 265 may optionally first verify that certain pre-requisites for the conversion have been satisfied. For example, in some embodiments, the hypervisor conversion system 260 may determine that the hypervisor 210, the hypervisor 220, and the hypervisor 230 on the first node 215, the second node 225, and the third node 235, respectively, are in fact running the first hypervisor type (e.g., ESXi). Similarly, the hypervisor conversion system 260 and/or the virtual machine conversion system 265 may also determine whether the first node 215, the second node 225, and the third node 235 after conversion are capable of running the second hypervisor type. The hypervisor conversion system 260 and/or the virtual machine conversion system 265 may perform additional and/or other checks to verify the suitability of converting the hypervisor 210, the hypervisor 220, and the hypervisor 230 on the first node 215, the second node 225, and the third node 235, respectively, from the first hypervisor type to the second hypervisor type. In other embodiments, the above checks may be skipped.

Although the hypervisor conversion system 260 and/or the virtual machine conversion system 265 have been described above as performing the pre-requisite checks, in other embodiments, another component of the migration tool 205 may perform these checks. In such cases, the hypervisor conversion system 260 and the virtual machine conversion system 265 start the conversion process upon receiving an indication from such another component that the pre-requisite checks have been satisfactorily completed. Thus, upon confirming that all pre-requisite checks for the conversion are satisfactorily completed or if the pre-requisite checks are not used, the hypervisor conversion system 260 and the virtual machine conversion system 265 start converting each of the first node 215, the second node 225, and the third node 235 of the cluster 255 from the first hypervisor type to the second hypervisor type one at a time based upon the order of conversion. Since the order of conversion converts the first node 215 first, the hypervisor conversion system 260 and the virtual machine conversion system 265 start the conversion process on the first node.

During conversion of the first node 215 from the first hypervisor type to the second hypervisor type, the second node 225 and the third node 235 keep running in a normal manner. Thus, the operations of the second node 225 and the third node 235 are not impacted by the conversion of the first node 215 from the first hypervisor type to the second type of hypervisor. In fact, the first node 215 may also continue operating during a significant portion of the conversion process. For example, in some embodiments, the virtual machines 240 on the first node 215 may stop receiving any additional workload requests, but may continue working on the existing workload requests. Additionally, the first node 215 may be put into a maintenance mode before conversion from the first hypervisor type to the second type of hypervisor. By putting the first node 215 in the maintenance mode, additional workload requests to the virtual machines 240 of the first node may be prevented. In other embodiments, the virtual machines 240 of the first node 215 may continue receiving additional workload requests.

Furthermore, the hypervisor state capture system 270 captures the existing state of the hypervisor 210 at operation 310. As indicated above, the existing state of the hypervisor 210 may include configuration details of the hypervisor such as number of virtual machines (e.g., the virtual machines 240) managed by the hypervisor, number of processing units, amount of memory, data associated with the hypervisor, and so on. Similarly, the virtual machine configuration capture system 275 captures the existing configuration parameters of the virtual machines 240 at the operation 310. The virtual machine configuration capture system 275 stores the captured configuration parameters in a designated location for access later. Likewise, the hypervisor state capture system 270 stores the captured state of the hypervisor 210 in a designated location.

Configuration parameters of a particular one of the virtual machines 240 may include information such as identity information (e.g., name, universally unique identifier, etc.) of that virtual machine, number of processing units (e.g., virtual central processing units) associated with that virtual machine, amount of memory associated with that virtual machine, location of data and metadata in the distributed storage (e.g., the storage pool 170 of FIG. 1) associated with the virtual machine, network settings such as the identity of networks that the virtual machine belongs to, media access control ("MAC") address of a network interface controller ("NIC") associated with that virtual machine, and an internet protocol ("IP") address of the NIC. In other embodiments, other or additional configuration parameters associated with each of the virtual machines 240 may be gathered. Generally speaking, any parameter that may be needed for properly operating the virtual machines 240 and allowing those virtual machines to perform their intended functions may be captured.

Upon capturing the existing state of the hypervisor 210 and the configuration parameters of the virtual machines 240 at the operation 310, at operation 315, the virtual machines 240 on the first node 215 are migrated to another node (e.g., the second node 225 or the third node 235) in the cluster 255. The migration of the virtual machines 240 from the first node 215 may be facilitated by the virtual machine conversion system 265 or another component of the migration tool 205.

Further, since the first node 215 is still running on the first hypervisor type and since the virtual machines 240 have not yet been converted for running on the second hypervisor type, the virtual machines are migrated to another node (e.g., the second node 225 or the third node 235) also having the first hypervisor type. By migrating the virtual machines 240 to another node (e.g., the second node 225 or the third node 235) also having the first hypervisor type, downtime of the virtual machines is greatly reduced in that the virtual machines may continue operating during and after the migration process. Thus, the migration of the virtual machines 240 from the first node 215 to another node (e.g., the second node 225 or the third node 235) also having the first hypervisor type in the cluster 255 may be termed as a "live" migration.

In some embodiments, all of the virtual machines 240 on the first node 215 may be migrated simultaneously to another node. In other embodiments, each of the virtual machines 240 on the first node 215 may be migrated one at a time. To migrate the virtual machines 240 (whether simultaneously or one at a time), the migration tool 205 (e.g., the virtual machine conversion system 265 or another component of the migration tool) may first identify the identity of another node to transfer the virtual machines 240. For example, the migration tool 205 may determine the type of hypervisor on the other nodes (e.g., the second node 225 or the third node 235) in the cluster 255 and pick a node running the first type of hypervisor. In some embodiments, the migration tool 205 may also take into consideration other factors such as the configuration of the virtual machines 240 and whether the other nodes have the capability for running the virtual machines 240. For example, if the virtual machines 240 require a specific type of graphic card, the migration tool 205 may identify which one of the second node 225 or the third node 235 is equipped with that particular graphic card. Thus, the migration tool 205 may take a variety of factors into consideration when determining which node (e.g., the second node 225 or the third node 235) to migrate the virtual machines 240 to from the first node 215. As an example, say the migration tool 205 determines that the virtual machines 240 are to be migrated to the second node 225.

Thus, to migrate the virtual machines 240 to the second node 225, the virtual machine conversion system 265 (or another component of the migration tool 205 responsible for migrating the virtual machines) creates instances of new virtual machines on the second node. The virtual machine conversion system 265 (or another component of the migration tool 205 responsible for migrating the virtual machines 240 to the second node 225) also associates the various configuration parameters of the virtual machines 240 captured at the operation 310 with the newly created instances of the virtual machines on the second node. Since the second node 225 is also running the first hypervisor type, a conversion of data of the virtual machines 240 for running properly on the newly created instances of the virtual machines on the second node is not needed. Further, since the cluster 255 is configured as a distributed storage system (e.g., with the storage pool 170 which is distributed in nature and may be accessed by any node within the cluster), the second node 225 is easily able to access to the data of the virtual machines 240 on the newly created virtual machines on the second node.

Once the newly created instances of the virtual machines 240 are properly running on the second node 225, the virtual machines 240 are deleted from the first node 215. At operation 320, the hypervisor 210 on the first node 215 is converted from the first hypervisor type to the second hypervisor type. In some embodiments, converting the hypervisor 210 from the first hypervisor type to the second hypervisor type may include uninstalling the first hypervisor type from the first node 215 and installing the second hypervisor type on the first node. Any configuration changes that are needed to the first node 215 to assimilate the second hypervisor type on the first node and operate the first node properly with the second hypervisor type may also be made at this time. In some embodiments, the process of converting from the first hypervisor type to the second hypervisor type may take approximately thirty minutes. In other embodiments, the process of converting from the first hypervisor type to the second hypervisor type may take a different amount of time. The process of converting the hypervisor 210 from the first type to the second type is performed by the hypervisor conversion system 260. While the hypervisor 210 is being converted from the first hypervisor type to the second hypervisor type, the newly created instances of the virtual machines 240 continue operating normally on the second node 225.

At operation 325, the newly created instances of the virtual machines 240 on the second node 225 are converted one at a time for running on the second hypervisor type and migrated back one at a time to the first node 215. Converting the virtual machines 240 includes converting the data of the virtual machines from a format suitable for the first hypervisor type to a format suitable for the second hypervisor type. Since virtual machines are configured for operating on one type of a hypervisor at a time (e.g., either the first hypervisor type or the second hypervisor type), before converting the newly created instances of the virtual machines 240 to run on the second hypervisor type, the newly created instances of the virtual machines on the second node are turned off. After data conversion, the newly created instances of the virtual machines 240 on the second node 225 are migrated back to the first node 215. Upon migrating back to the first node 215, the virtual machines 240 are turned back on. The turning off of the virtual machines 240 requires a short downtime of the virtual machines. However, this downtime is of the order of minutes (e.g., one or two minutes) and is greatly reduced from the downtime of a several hours in conventional mechanisms. The process for converting the virtual machines 240 for running on the second hypervisor type is described in greater detail below.

The process 300 for converting from the first hypervisor type to the second hypervisor type for the first node 215 ends at operation 330. Since the second node 225 is next in the order of conversion, the second node is converted next from the first hypervisor type to the second hypervisor type using the operations 310-325 described above. A simplified illustration of converting the first node 215 and the second node 225 from the first hypervisor type to the second hypervisor type is shown in FIGS. 4A-4I.

Referring to FIGS. 4A-4I in conjunction with FIGS. 2 and 3, a process 400 for converting a first node 405 and a second node 410 from a first hypervisor type to a second hypervisor type in a cluster 415 is shown, in accordance with some embodiments of the present disclosure. The first node 405 may be considered analogous to the first node 215, the second node 410 may be considered analogous to the second node 225, and a third node 420 may be considered analogous to the third node 235.

Figure 4A:
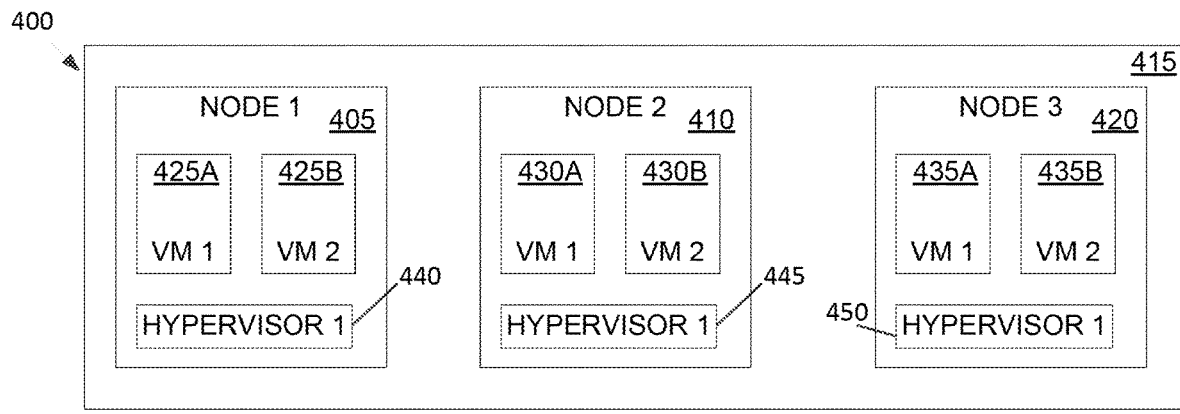
FIGS. 4A-4I are example diagrams illustrating conversion from the first hypervisor type to the second hypervisor type for first two nodes in the cluster of three nodes of the virtual computing system of FIG. 1, in accordance with some embodiments of the present disclosure.

As also shown in FIG. 4A, the first node 405 includes a first virtual machine 425A and a second virtual machine 425B (collectively referred to herein as "virtual machines 425"), the second node 410 includes a first virtual machine 430A and a second virtual machine 430B (collectively referred to herein as "virtual machines 430"), and the third node 420 includes a first virtual machine 435A and a second virtual machine 435B (collectively referred to herein as "virtual machines 435"). It is to be understood that the number of virtual machines on each of the first node 405, the second node 410, and the third node 420 may vary from one embodiment to another and need not be the same number. The first node 405 also includes a hypervisor 440, the second node 410 includes a hypervisor 445, and the third hypervisor includes a hypervisor 450.

It is to be understood that the cluster 415 is part of a virtual computing system (e.g., the virtual computing system 100), and therefore, includes all of the components that are discussed above with respect to virtual computing systems. The cluster 415 is shown in a greatly simplified form simply for ease of explanation. Thus, even though each of the first node 405, the second node 410, and the third node 420 are shown as having only the virtual machines and the hypervisor, in other embodiments, other components discussed above, including the migration tool 205, are intended to be part of the cluster 415 and/or the virtual computing system of which the cluster is a part.

Before the conversion, as shown in FIG. 4A, each of the first node 405, the second node 410, and the third node 420 has the first hypervisor type installed thereon. The first hypervisor type is referred to in FIGS. 4A-4I as "hypervisor 1" and the second hypervisor type is referred to as "hypervisor 2." If the order of conversion involves converting the first node 405 followed by conversion of the second node 410 and then the third node 420, the first node is converted first. As discussed above, the migration tool 205 optionally checks that all pre-requisites are satisfied and captures a current or existing state of the hypervisor 440 and the virtual machines 425 on the first node 405 before starting the conversion process.

Figure 4B:
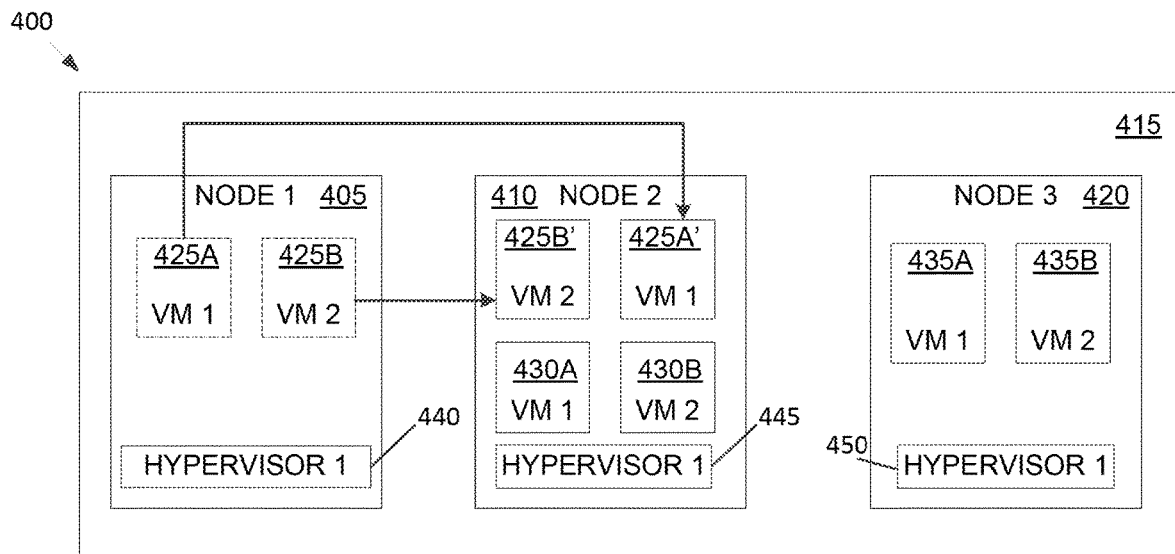
Figure 4C:
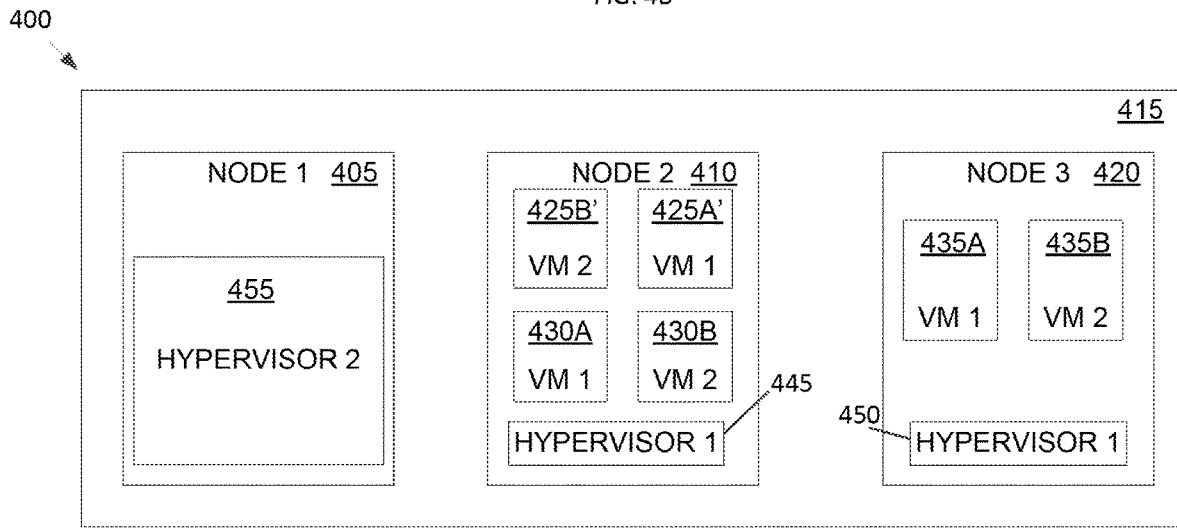

As shown in FIG. 4B, the virtual machines 425 from the first node 405 are migrated to another node (e.g., the second node 410). Upon migrating, the second node 410 includes the virtual machines 430 that were originally present on the second node, as well as a first virtual machine 425A' and a second virtual machine 425B'. The first virtual machine 425A' is the migrated and newly created instance of the first virtual machine 425A (which is shown in dashed lines in FIG. 4B) and the second virtual machine 425B' is the migrated and newly created instance of the second virtual machine 425B (which is also shown in dashed lines in FIG. 4B). Upon successfully migrating the virtual machines 425 to the second node 410, the hypervisor 440 on the first node 405 is converted from the first hypervisor type (e.g., Hypervisor 1) to the second hypervisor type (e.g., Hypervisor 2), as shown in FIG. 4C. In the meantime, the first virtual machine 425A' and the second virtual machine 425B' corresponding to the first virtual machine 425A and the second virtual machine 425B, respectively, continue running normally on the second node 410.

Figure 4D:
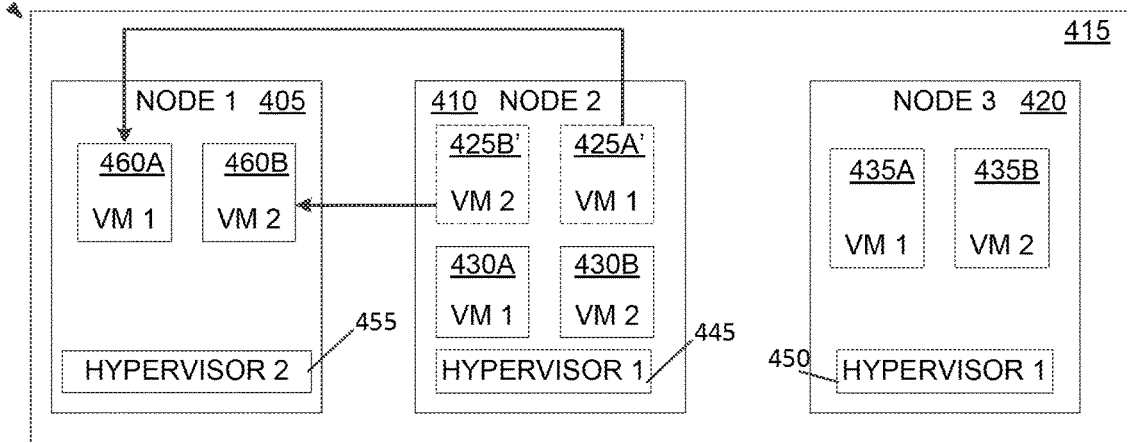

As also shown in FIG. 4C, upon converting, the first node 405 includes a hypervisor 455, which is of the second hypervisor type. The first virtual machine 425A' and the second virtual machine 425B' corresponding to the first virtual machine 425A and the second virtual machine 425B, respectively, still continue to run on the second node 410. Once the first node 405 has successfully converted to the hypervisor 455, the first virtual machine 425A' and the second virtual machine 425B' are converted for running on the hypervisor 455 of the second hypervisor type and migrated back to the first node, as shown in FIG. 4D. In some embodiments, the first virtual machine 425A' and the second virtual machine 425B' are converted one at a time and migrated back to the first node 405 one at a time. In some embodiments, both of the first virtual machine 425A' and the second virtual machine 425B' may be converted one at a time before those virtual machines are migrated back to the first node 405, also one at a time. In other embodiments, one of the first virtual machine 425A' and the second virtual machine 425B' may be converted and migrated back to the first node 405 before the other one of the first virtual machine 425A' and the second virtual machine 425B' is converted and migrated.

Figure 4E:
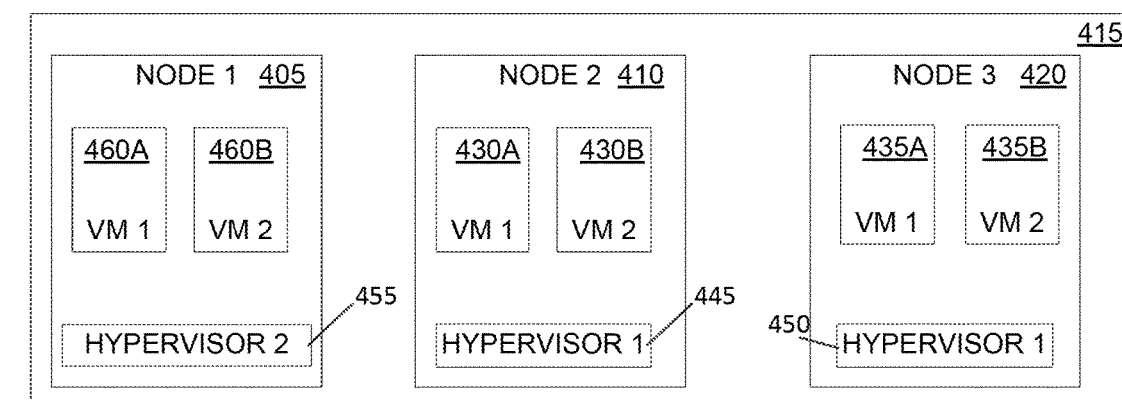

Upon successfully migrating the first virtual machine 425A' and the second virtual machine 425B' to the first node 405, the first node includes a first virtual machine 460A and a second virtual machine 460B, as shown in FIG. 4E, both of which are configured for running on the hypervisor 455, which again is of the second hypervisor type. The first virtual machine 460A and the second virtual machine 460B have the same configuration parameters as that of the first virtual machine 425A and the second virtual machine 425B, respectively. Thus, after the conversion of the first node 405, the first node runs the second hypervisor type (e.g., the hypervisor 455) and the second node 410 and the third node 420 are still running the first hypervisor type (e.g., the hypervisor 445 and the hypervisor 450, respectively).

Figure 4F:
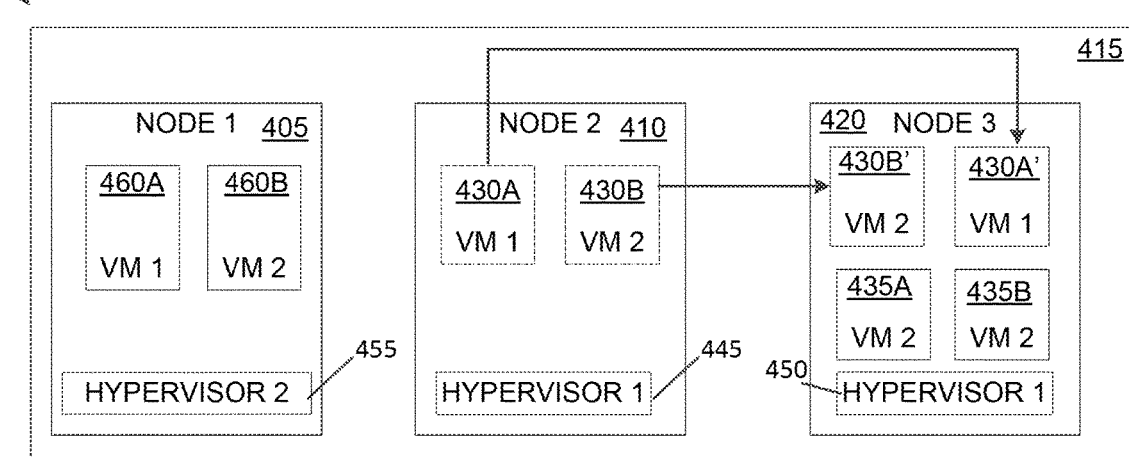

To convert the second node 410 to the second hypervisor type (e.g., "Hypervisor 2"), the process discussed above with respect to the first node 405 is repeated for the second node 410. Specifically, as shown in FIG. 4F, the virtual machines 430 from the second node 410 are migrated to the third node 420. Since there are only three nodes in the cluster 415 and the first node 405 has already been converted to the second hypervisor type, the migration tool 205 migrates the virtual machines 430 to the third node 420, which is still running the first hypervisor type. Upon migration, the third node 420 includes the virtual machines 435, which were originally running on the third node, as well as a first virtual machine 430A' corresponding to a migrated and newly created instance of the first virtual machine 430A and a second virtual machine 430B' corresponding to a migrated and newly created instance of the second virtual machine 430B.

Figure 4G:
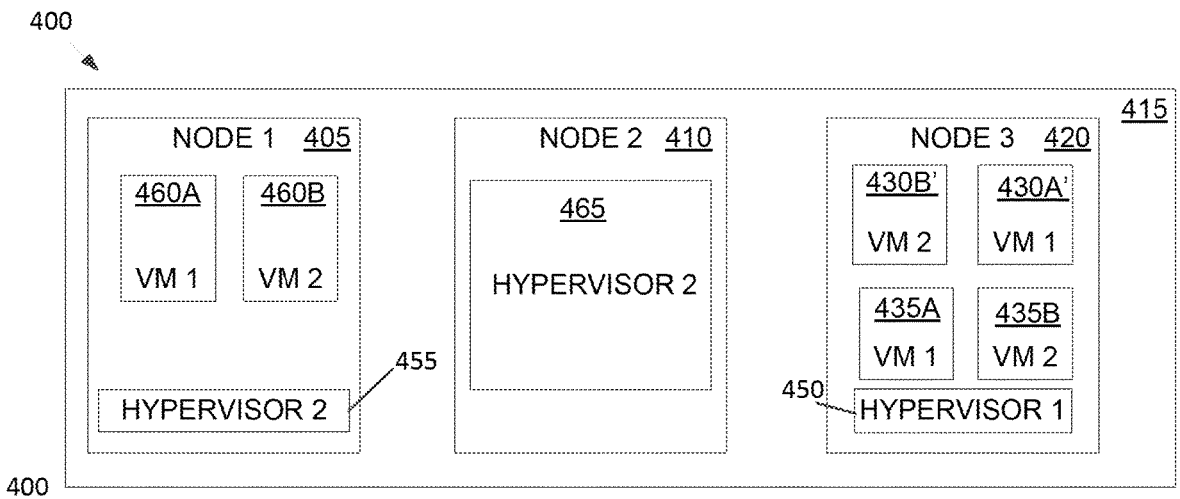
Figure 4H:
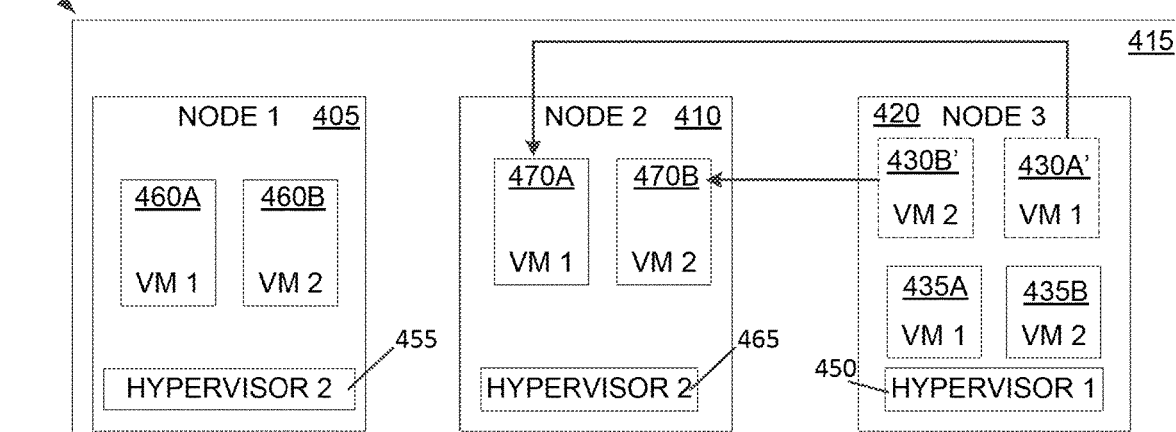

As shown in FIG. 4G, upon migrating the virtual machines 430 to the third node 420, the hypervisor 445 on the second node 410 is converted hypervisor 465, which is of the second hypervisor type. During the conversion of the hypervisor 445, the first virtual machine 430A' and the second virtual machine 430B' continue to run on the third node 420 normally. Thus, there is no disruption of operation of the virtual machines 430 during conversion to the hypervisor 465. Upon conversion to the hypervisor 465, the first virtual machine 430A' and the second virtual machine 430B' are converted one at a time for running on the hypervisor 465 and, as shown in FIG. 4H, migrated back to the second node 410 as a first virtual machine 470A and a second virtual machine 470B, respectively. The first virtual machine 470A and the second virtual machine 470B are optimized for running on the hypervisor 465, which is of the second hypervisor type.

Figure 4I:
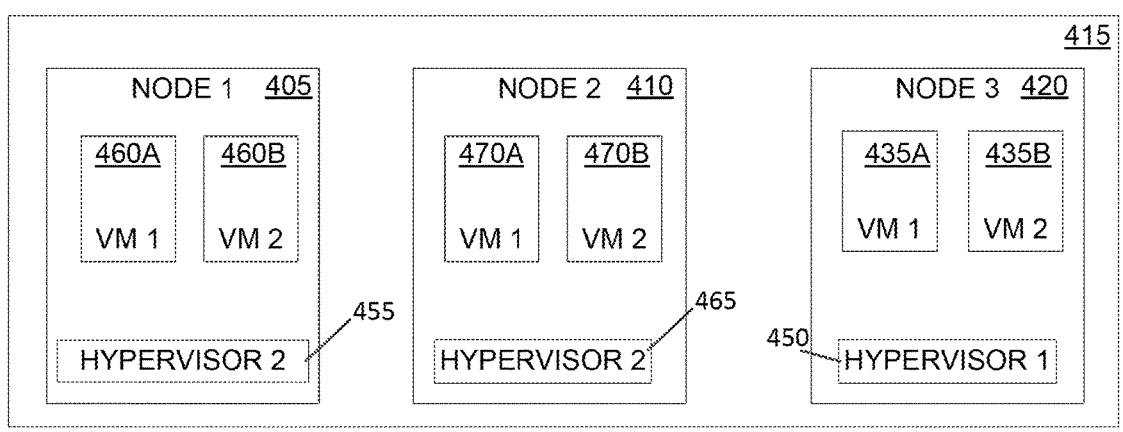

Thus, after conversion of the second node 410, as shown in FIG. 4I, the first node 405 runs the second hypervisor type (e.g., the hypervisor 455) and the second node 410 also runs the second hypervisor type (e.g., the hypervisor 465), while the third node 420 still runs the first hypervisor type (e.g., the hypervisor 450). Further, the first node 405 runs the first virtual machine 460A and the second virtual machine 460B, which are optimized for running on the hypervisor 455 (but have the same configuration parameters as the virtual machines 425) and the second node 410 runs the first virtual machine 470A and the second virtual machine 470B, which are optimized for running on the hypervisor 465 (but have the same configuration parameters as the virtual machines 430).

Figure 5:
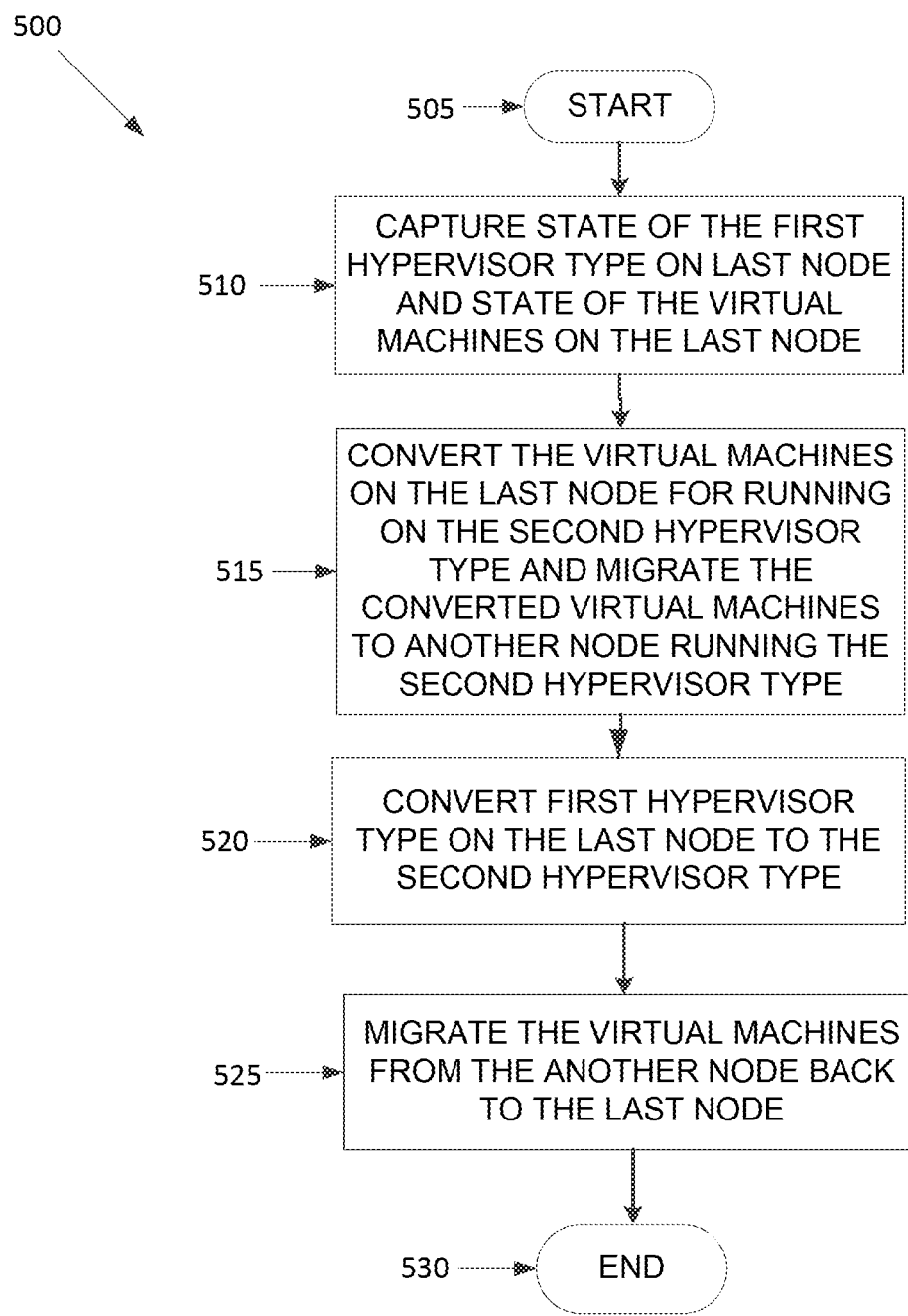
FIG. 5 is an example flowchart outlining operations for converting from the first hypervisor type to the second hypervisor type on the last node in the cluster of the virtual computing system of FIG. 1, in accordance with some embodiments of the present disclosure.

Referring to FIG. 5 now, a process 500 for converting a last node of a cluster is shown, in accordance with at least some embodiments of the present disclosure. The process 500 may include additional, fewer, or different operations, depending on the particular embodiment. Further, the process 500 is described in conjunction with FIG. 2. Thus, the process 500 is used for converting the third node 235 in the cluster 255 from a first hypervisor type (e.g., ESXi) to a second hypervisor type (e.g., AHV). Further, the process 500 is described with the order of conversion in which the first node 215 is converted first, followed by the second node 225, and then the third node 235 is converted last from the first hypervisor type to the second hypervisor type. FIG. 3 and process 300 above described the process of converting the first node 215 and the second node 225 from the first hypervisor type to the second hypervisor type. The process 500 now describes the process of converting the last node (e.g., the third node 235) in the cluster 255 to the second hypervisor type.

Thus, at the time of converting the last node (e.g., the third node 235) to the second hypervisor type, the other nodes (e.g., the first node 215 and the second node 225) in the cluster 255 are already converted and running on the second hypervisor type. The third node 235 is the only node to be running on the first hypervisor type. The conversion process for the third node 235 is somewhat different from the conversion process for the first node 215 and the second node 225 because there are no other nodes in the cluster 255 running the same type of hypervisor as the third node to which the virtual machines 250 of the third node may be migrated to. Thus, the virtual machines 250 of the third node 235 are converted for running on the second hypervisor type before being migrated. Thus, the virtual machines 250 incur a downtime towards the start of the conversion process (relative to the virtual machines 240 and virtual machines 245, which incur the downtime towards the end of the conversion process).

The process 500 starts at operation 505 upon completing conversion of the first node 215 and the second node 225 from the first hypervisor type to the second hypervisor type. At operation 510, the hypervisor state capture system 270 captures the current or existing state of the hypervisor 230 and the virtual machine configuration capture system 275 captures the configuration parameters of the virtual machines 250 of the third node 235. At operation 515, the virtual machines 250 running on the third node 235 are converted for running on the second hypervisor type. Thus, the virtual machines 250 of the third node 235 are converted before migrating as opposed to the conversion process of the first node 215 and the second node 225 in which the virtual machines 240 and the virtual machines 245, respectively, are migrated to other nodes of the same hypervisor before conversion. Again, the conversion of the virtual machines 250 is discussed in greater detail below with respect to FIG. 7.

Upon conversion of the virtual machines 250 for running on the second hypervisor type, those virtual machines, which are still turned off, are migrated to another node (e.g., the first node 215 or the second node 225), which are already running the second hypervisor type. For example, to migrate the converted instances of the virtual machines 250 from the third node 235 to the second node 225, new instances of the virtual machines 250 are created on the second node using the configuration parameters of the virtual machines 250 from the third node 235. The newly created instances of the virtual machines 250 on the second node 225 are turned on and since the virtual machines 250 were already converted, the newly created instances of the virtual machines 250 continue operation on the second node 225 with the second hypervisor type.

At operation 520, the hypervisor 230 on the third node is converted from the first hypervisor type to the second hypervisor type, as discussed above. At operation 525, the newly created instances of the virtual machines 250 on the second node 225 are migrated back to the third node 235. Since the virtual machines 250 were already converted and optimized for running on the second hypervisor type at the operation 515, no conversion (and no downtime) is needed at this point. Thus, the instances of the virtual machines 250 are simply migrated back to the third node 235 at operation 525, and the process 500 ends at operation 530.

Figure 6A:
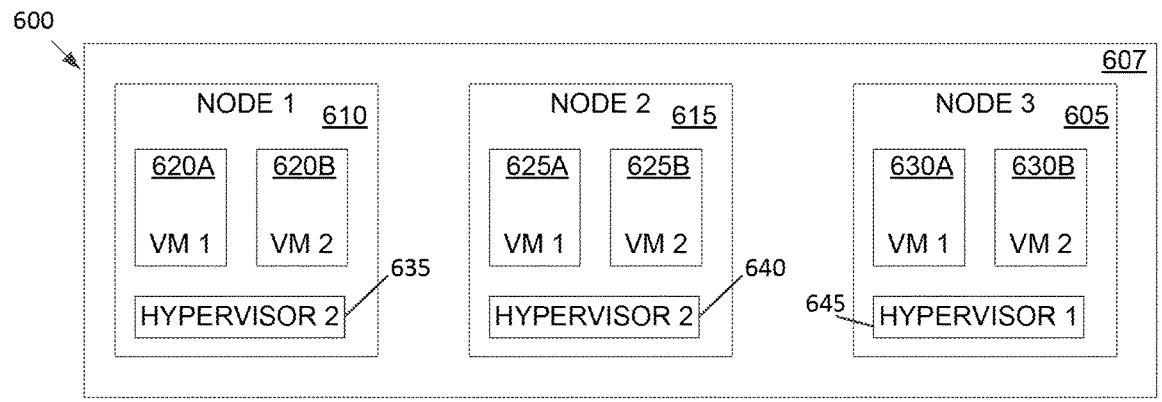
FIGS. 6A-6E are example diagrams illustrating conversion from the first hypervisor type to the first hypervisor type on the last node in the cluster of three nodes of the virtual computing system of FIG. 1, in accordance with some embodiments of the present disclosure.

The various operations for converting a third node to a second hypervisor type are illustrated in FIGS. 6A-6E below. Referring to FIGS. 6A-6E in conjunction with FIGS. 4A-4E and 5, a process 600 of converting a third node 605 from a first hypervisor type to a second hypervisor type in a cluster 607 is shown, in accordance with some embodiments of the present disclosure. A first node 610 of the cluster 607 may be considered analogous to the first node 405 of FIGS. 4A-4I, a second node 615 may be considered analogous to the second node 410, and the third node 605 may be considered analogous to the third node 420. Thus, as shown in FIG. 6A, the first node 610 includes a first virtual machine 620A and a second virtual machine 620B (collectively referred to herein as "virtual machines 620"), the second node 615 includes a first virtual machine 625A and a second virtual machine 625B (collectively referred to herein as "virtual machines 625"), and the third node 605 includes a first virtual machine 630A and a second virtual machine 630B (collectively referred to herein as "virtual machines 630"). The first node 610 also includes a hypervisor 635, the second node 615 includes a hypervisor 640, and the third node 605 includes a hypervisor 645.

The virtual machines 620, the virtual machines 625, and the virtual machines 630 are analogous to the virtual machines 460, the virtual machines 470, and the virtual machines 435, respectively, of FIG. 4I. At the time of converting the third node 605, the hypervisor 635 is analogous to the hypervisor 455, the hypervisor 640 is analogous to the hypervisor 465, and the hypervisor 645 is analogous to the hypervisor 450. Thus, the process 600 picks up where the process 400 left off. Accordingly, the process 600 starts after the first node 610 and the second node 615 have been converted to the second hypervisor type.

Figure 6B:
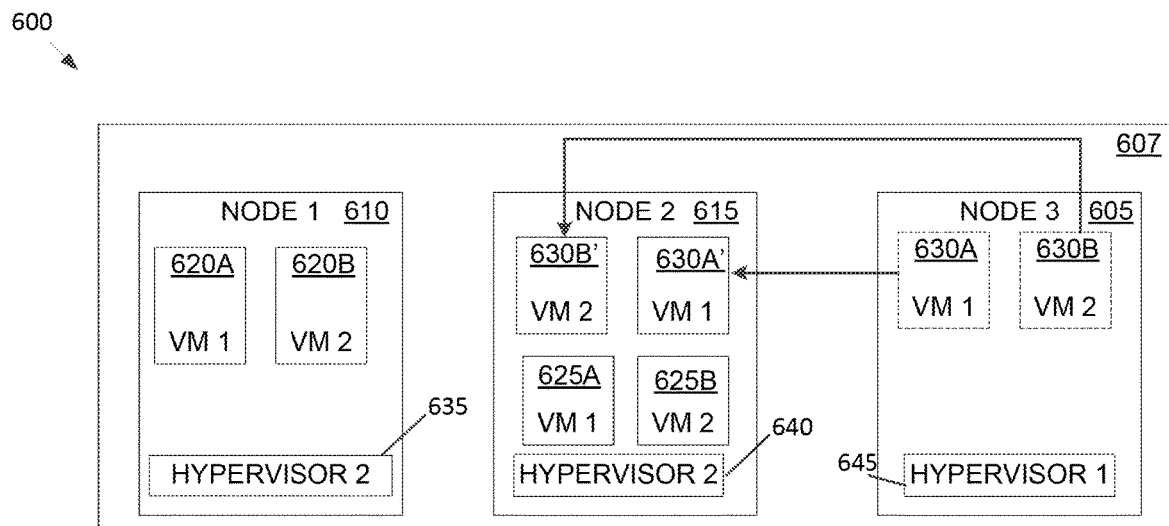

To convert the third node 605 to the second hypervisor type (e.g., "Hypervisor 2"), the virtual machines 630 on the third node are first converted for running on the second hypervisor type. Thus, the virtual machines 630 are turned off and converted. Upon conversion, as shown in FIG. 6B, the virtual machines are migrated to, for example, the second node 615 as first virtual machine 630A' and second virtual machine 630B', and turned on. The second node 615 is already running the second hypervisor type on the hypervisor 640. Since the first virtual machine 630A' and the second virtual machine 630B' have already been converted for running on the second hypervisor type (e.g., the hypervisor 640), the first virtual machine 630A' and the second virtual machine 630B' may continue normal operations on the second node 615 without problems.

Figure 6C:
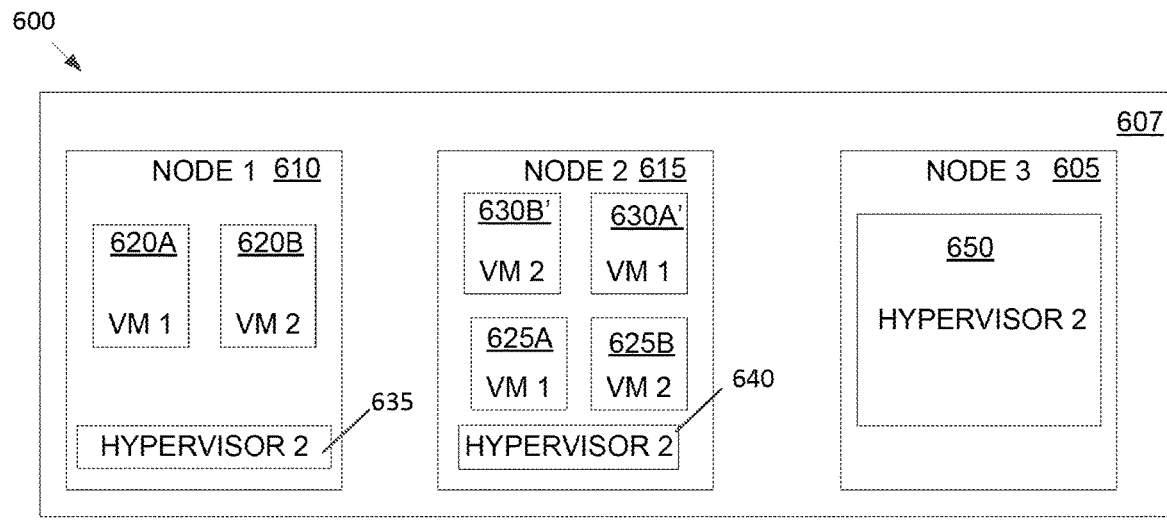
Figure 6D:
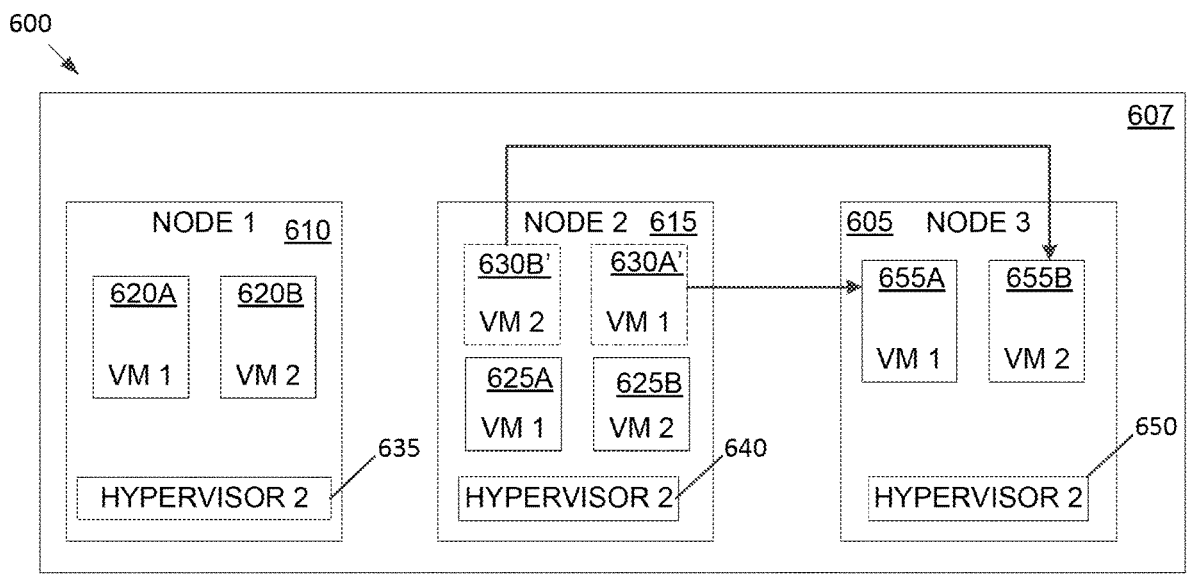
Figure 6E:
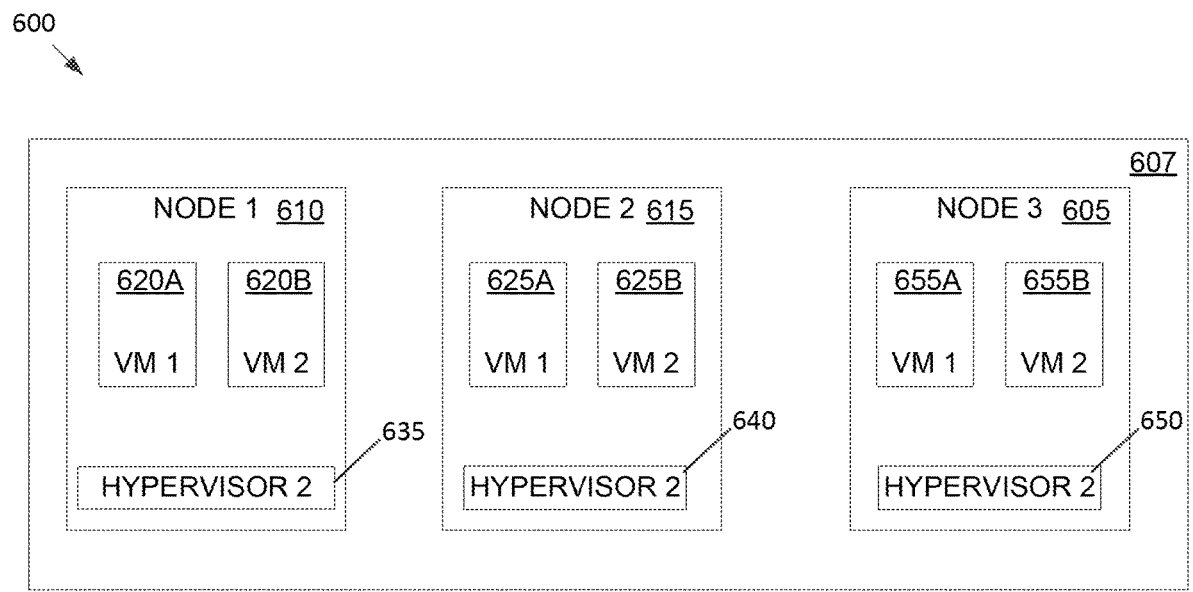

After receiving the first virtual machine 630A' and the second virtual machine 630B', the second node 615 includes the virtual machines 625, which were originally running on the second node, as well as the first virtual machine 630A' and the second virtual machine 630B', as shown in FIG. 6C. Further, as shown in FIG. 6C, the hypervisor 645 on the third node 605 is converted to hypervisor 650, which is of the second hypervisor type. Upon converting, the first virtual machine 630A' and the second virtual machine 630B' are migrated back from the second node 615 to the third node 605 as a first virtual machine 655A and a second virtual machine 655B, respectively, as shown in FIG. 6D. Since the first virtual machine 630A' and the second virtual machine 630B' were converted at the time of migrating to the second node 615, no additional conversion of the first virtual machine 630A' and the second virtual machine 630B' is needed at this time. As shown in FIG. 6E, after the conversion of the third node 605 to the second type of hypervisor, all of the nodes in the cluster 607 are running the second type of hypervisor. Thus, the first node 610, the second node 615, and the third node 605 are all converted from the first hypervisor type to the second type of hypervisor.

The processes 300 and 500 discussed above may also be used for a reverse conversion from the second hypervisor type to the first hypervisor type. Since the current state of the first hypervisor type was preserved before the conversion, the reverse conversion may restore the same state of the first hypervisor type after converting back.

Figure 7:
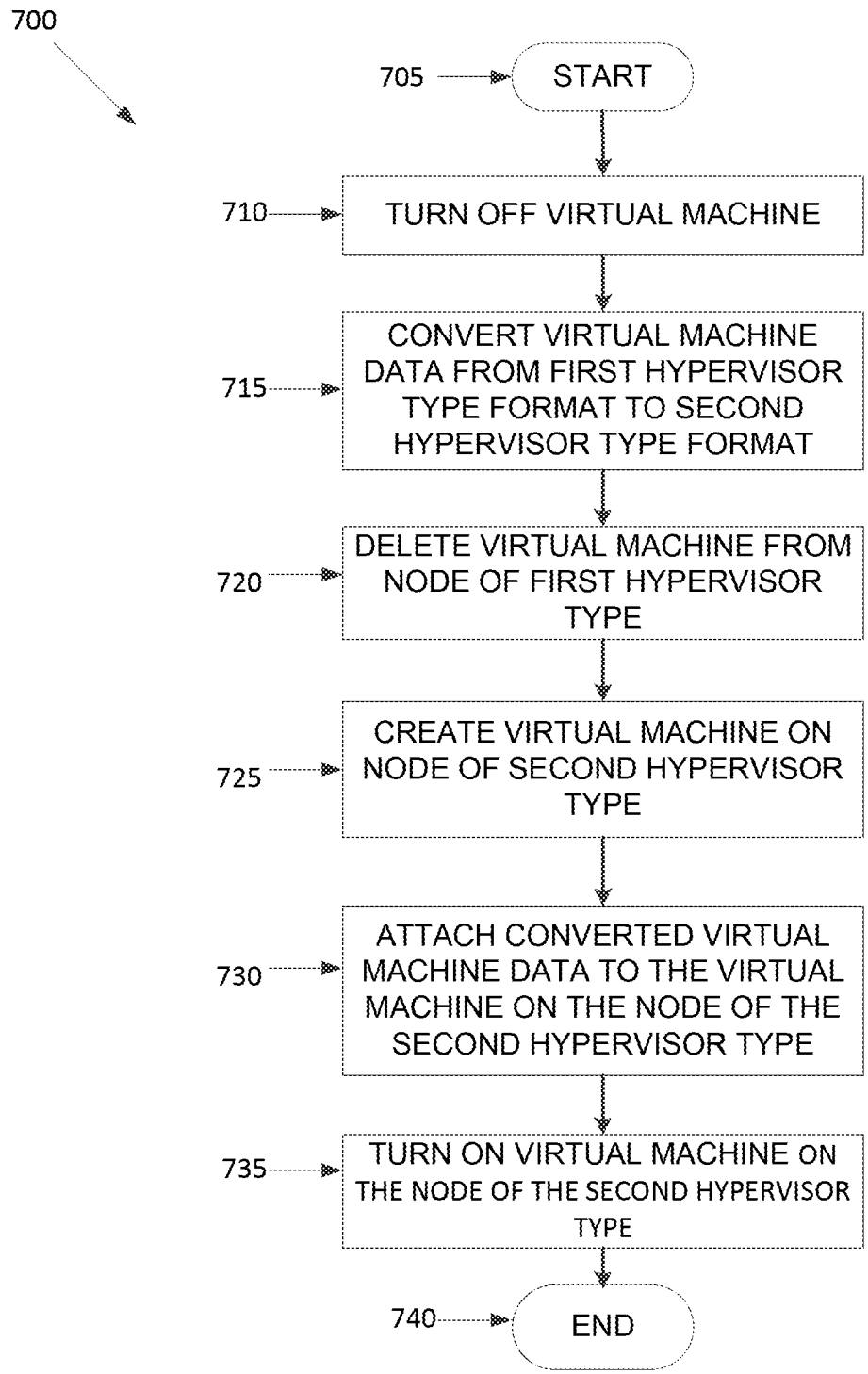
FIG. 7 is an example flowchart outlining operations for converting a virtual machine for running from the first hypervisor type to the second hypervisor type, in accordance with some embodiments of the present disclosure.

Turning now to FIG. 7, an example process 700 for converting a virtual machine configured to run on a first hypervisor type to a virtual machine configured to run on a second hypervisor type is shown, in accordance with some embodiments of the present disclosure. The process 500 may include additional, fewer, or different operations, depending on the particular embodiment. As indicated above, virtual machines are configured and optimized for the underlying hypervisor on a given node. Thus, a node running the first hypervisor type has virtual machines that are optimized for the first hypervisor type. When the underlying hypervisor on the node is changed from the first hypervisor type to the second hypervisor type, the virtual machines on that node need to be reconfigured and re-optimized, and therefore "converted," for running on the second hypervisor type. In conventional mechanisms, conversion of the virtual machines from the first hypervisor type to the second hypervisor type requires turning off the virtual machines and manually reconfiguring those virtual machines for the second hypervisor type. The virtual machines remain turned off until those virtual machines have been reconfigured for the second hypervisor type. In conventional mechanisms, this downtime of when the virtual machines are turned off is of the order of a several hours. During the downtime, the virtual machines are inoperable, causing inconvenience to users and decreasing the performance capability of the virtual machines.

The process 700 provides a mechanism to convert the virtual machines from the first hypervisor type to the second hypervisor type in an efficient, easy, and convenient manner while minimizing the downtime from several hours of the conventional mechanisms to a few minutes. Further, the process 700 converts the virtual machines in a manner such that a manual reconfiguration of the virtual machines for operation on the second hypervisor type is not needed. The process 700 may be used to convert all of the virtual machines within a cluster from the first hypervisor type to the second hypervisor type.

For example and with reference to FIG. 4A, the process 700 may be used for converting the virtual machines 425, 430, and 435 from the first hypervisor type (e.g., the hypervisor 440, the hypervisor 445, and the hypervisor 450) to the second hypervisor type. Further, for all nodes except a last node in the cluster, the process 700 is used after the conversion of the hypervisor from the first hypervisor type to the second hypervisor type. Thus and with reference to FIG. 4D, the process 700 is used for the first node 405 at the time of migrating the first virtual machine 425A' and the second virtual machine 425B' from the second node 410 back to the first node 405. Similarly and with reference to FIG. 4H, the process 700 is used for the second node 410 when the first virtual machine 430A' and the second virtual machine 430B' are being migrated from the third node 420 back to the second node 410.

For the last node, the process 700 is used before conversion of the hypervisor from the first hypervisor type to the second hypervisor type. For example and with reference to FIG. 6B, the first virtual machine 630A and the second virtual machine 630B are converted at the time of migrating from the third node 605 to the second node 615. In sum, for all nodes in a cluster except the last node, the process 700 is performed at the operation 325 (See FIG. 3) of the hypervisor conversion process and for the last node, the process 700 is performed at the operation 515 (See FIG. 5) of the hypervisor conversion process.

Thus, the conversion process 700 starts at operation 705. At operation 710, the virtual machine being converted is turned off. For example, in some embodiments, the virtual machine may be simply powered off. In other embodiments, other designated operations may be performed for turning off the virtual machine. Upon turning the virtual machine off, at operation 715, the turned off virtual machine is converted for running from the first hypervisor type to the second hypervisor type. Converting the virtual machine includes, in some embodiments, converting the data of the virtual machine. Specifically, the format of the data of the virtual machine is specifically tailored for use on and by a specific type of hypervisor. Thus, the format of the data is hypervisor specific. When the hypervisor is converted from the first hypervisor type to the second hypervisor type, the format of the data of the virtual machine also needs to be converted to be suitable for the second hypervisor type. The virtual machine conversion system 265 of FIG. 2 converts the format of data of the virtual machine being converted. The virtual machine conversion system 265 may also convert other parameters of the virtual machine that are hypervisor specific to be suitable for the second hypervisor type.

Upon converting the virtual machine, at operations 720 and 725, the virtual machine is deleted from the node the virtual machine is currently residing on (which has the first type of hypervisor) and a new instance of the virtual machine is created on the node that the virtual machine was originally residing on (which now has the second type of hypervisor). In some embodiments, the virtual machine may be deleted from the current node before the instance of the virtual machine is created on the original node. In other embodiments, the new instance of the virtual machine may be created on the original node before the virtual machine is deleted from the current node. In yet embodiments, the creation and deletion operations may occur simultaneously (or substantially simultaneously). The new instance of the virtual machine is created using the same configuration parameters (or configuration parameters based on the original configuration parameters that were optimized for the second hypervisor type by the virtual machine conversion system 265) that were captured before the conversion process.

After the virtual machine creation, in some embodiments, the MAC address of the NIC of the new instance of the virtual machine that is created may change. The virtual machine conversion system 265 is configured to determine the new MAC address of the NIC from the MAC address that was gathered previously as part of the configuration parameters, and associate the new MAC address with the new instance of the virtual machine. In some embodiments, the virtual machine conversion system 265 may use a mapping mechanism to determine the new MAC address from the MAC address previously captured. Thus, the network settings of the new instance of the virtual machine are also restored despite the changes in those network settings. Accordingly, contrary to conventional mechanisms, no manual reconfiguration of the network settings is needed. The virtual machine conversion system 265 automatically converts and configures each virtual machine for running on the second hypervisor type without specific inputs from the user.

At operation 730, the virtual machine conversion system 265 attaches the data that was converted at the operation 715 with the new instance of the virtual machine and at operation 735, the virtual machine conversion system turns on the new instance of the virtual machine. The time that elapses between the time the virtual machine is turned off at operation 710 and the new instance of the virtual machine is turned on at the operation 735 is of the order of a few minutes. For example, in some embodiments, the time to perform the various operations between the operations 710 and 735 is about one to two minutes. In other embodiments, a different amount of time, albeit only of a few minutes, may lapse between the operations 710 and 735. Thus, the process converts each virtual machine for running from the first hypervisor type to the second hypervisor type in a few minutes, providing a significant time saving compared to the conventional mechanisms, which require a downtime of several hours. The process 700 ends at operation 740.

Thus, the present disclosure provides a system and method for converting the hypervisor from a first hypervisor type to a second hypervisor type, and converting the virtual machines for running from the first hypervisor type to the second hypervisor type in an efficient, easy, and automatic manner. The downtime of the virtual machines during the conversion process is minimized and the configuration of the virtual machines is preserved during the virtual machine conversion.

Although the present disclosure has been described with respect to software applications, in other embodiments, one or more aspects of the present disclosure may be applicable to other components of the virtual computing system 100 that may be suitable for real-time monitoring by the user.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
receiving, by a migration tool, an indication for hypervisor conversion from a first hypervisor type to a second hypervisor type;
migrating a first virtual machine (VM) from a first node to another node having another hypervisor of the first hypervisor type;
converting, by the migration tool, a first hypervisor on the first node from the first hypervisor type to the second hypervisor type in response to the indication;
converting the first VM to the second hypervisor type and migrating the converted first VM back to the first node from the another node; and
converting a second virtual machine (VM) on a second node to operate on the second hypervisor type before converting a second hypervisor on the second node to the second hypervisor type;
wherein the first hypervisor and the first VM are converted on the first node before starting conversion of the second another hypervisor and the second VM on the second node.

2. The method of claim 1, wherein the hypervisor conversion for the first node further comprises:
migrating, by the migration tool, the first virtual machine from the first node to the second node, wherein the first node and the second node are each operating on the first hypervisor type; and
converting, by the migration tool, the hypervisor on the first node from the first hypervisor type to the second hypervisor type.

3. The method of claim 2, wherein the hypervisor conversion further comprises:
converting, by the migration tool, the first virtual machine migrated to the second node for running on the second hypervisor type, wherein the converting of the first virtual machine comprises migrating, by the migration tool, the converted first virtual machine from the second node back to the first node.

4. The method of claim 1, wherein the hypervisor conversion for the second node comprises:
converting, by the migration tool, the second virtual machine on the second node for running on the second hypervisor type; and
migrating, by the migration tool, the converted second virtual machine from the second node to the first node.

5. The method of claim 4, further comprising:
converting, by the migration tool, the hypervisor on the second node from the first hypervisor type to the second hypervisor type; and
migrating, by the migration tool, the converted virtual machine from the first node back to the second node.

6. The method of claim 1, wherein converting a virtual machine comprises converting a format of data associated with the virtual machine to be suitable for the second hypervisor type.

7. The method of claim 1, wherein converting the first virtual machine comprises:
turning off, by the migration tool, the first virtual machine on the first node before converting the first virtual machine; and
converting, by the migration tool, a format of data associated with the first virtual machine to be suitable for the second hypervisor type and migrating the first virtual machine to the another node in the cluster.

8. The method of claim 7, wherein migrating the first virtual machine to the another node comprises deleting the first virtual machine from the first node.

9. The method of claim 7, wherein migrating the first virtual machine to the another node comprises:
creating, by the migration tool, a new instance of the first virtual machine on the another node; and
turning on, by the migration tool, the new instance of the first virtual machine on the another node.

10. The method of claim 7, further comprising creating a new instance of the first virtual machine on the another node with configuration parameters of the first virtual machine preserved by the migration tool before turning off the first virtual machine.

11. The method of claim 7, further comprising attaching the converted format of the data to a new instance of the first virtual machine on the another node.

12. A non-transitory computer readable media including computer-executable instructions embodied thereon that, when executed by a processor of a migration tool, cause the migration tool to perform a process comprising:
receiving an indication for hypervisor conversion from a first hypervisor type to a second hypervisor;
converting a hypervisor on a first node to the second hypervisor type before converting virtual machines on the first node to operate on the second hypervisor type; and
converting a second VM on a second node to operate on the second hypervisor type before converting a second hypervisor on the second node to the second hypervisor type;
wherein the virtual machines on the first node and the second node remain operational during the conversion of the hypervisor on each of the first node and the second node to the second hypervisor type.

13. The non-transitory computer readable media of claim 12, wherein the migration tool captures an existing state of the first hypervisor type before starting the hypervisor conversion to the second hypervisor type.

14. The non-transitory computer readable media of claim 12, wherein the migration tool captures configuration parameters of virtual machines before starting the hypervisor conversion to the second hypervisor type.

15. The non-transitory computer readable media of claim 14, wherein the migration tool automatically applies the captured configuration parameters to new instances of the virtual machines created after the hypervisor conversion.

16. The non-transitory computer readable media of claim 12, wherein:
nodes for the hypervisor conversion comprise a first set of nodes and the second node, wherein the first node is part of the first set of nodes; and
the hypervisor conversion on each of the first set of nodes is performed before the hypervisor conversion on the second node.

17. An apparatus comprising:
a migration tool comprising:
a hypervisor conversion system that converts a hypervisor in a cluster of a virtual computing system from a first hypervisor type to a second hypervisor type; and
a virtual machine conversion system that converts virtual machines to operate on the second hypervisor type,
wherein the migration tool migrates a first virtual machine (VM) from a first node to another node having another hypervisor of the first hypervisor type;

wherein the hypervisor and the first VM are converted on the first node before the hypervisor and a second VM on a second node;

wherein the second VM is converted to operate on the second hypervisor type before converting a second hypervisor on the second node to the second hypervisor type; and wherein the first VM and the second VM remain operational while converting.

18. The apparatus of claim 17, wherein the migration tool is part of a controller/service virtual machine, and wherein an instance of the controller/service virtual machine is installed on each of the plurality of nodes.

19. The apparatus of claim 17, wherein the migration tool is part of a management system that manages the cluster along with other clusters in the virtual computing system.

20. The apparatus of claim 17, wherein the migration tool accesses is a storage pool of the virtual computing system to store configuration parameters of the virtual machines and an existing state of the first hypervisor type.

21. The apparatus of claim 17, wherein the hypervisor conversion system converts the hypervisor on each node from the second hypervisor type to the first hypervisor type.

22. A non-transitory computer readable media including computer-executable instructions embodied thereon that, when executed by a processor of a migration tool, cause the migration tool to perform a process comprising:

receiving an indication for hypervisor conversion from a first hypervisor type to a second hypervisor type;

converting a hypervisor on a first node to the second hypervisor type in response to the indication before converting a virtual machine on the first node to operate on the second hypervisor type; and converting a virtual machine on a second node to operate on the second hypervisor type before converting a second hypervisor on the second node to the second hypervisor type, wherein the hypervisor conversion for the second node comprises: converting the virtual machine on the second node for running on the second hypervisor type and migrating the converted virtual machine from the second node to the first node;

wherein the hypervisor and the virtual machine on the first node are converted before conversion of another hypervisor and virtual machine on another node; and wherein the virtual machine remains operational during conversion of the hypervisor.

23. The non-transitory computer readable media of claim 22, wherein the hypervisor conversion for the first node comprises:

migrating the virtual machine from the first node to the second node, wherein the first node and the second node are each operating on the first hypervisor type; and converting the hypervisor on the first node from the first hypervisor type to the second hypervisor type; and converting the virtual machine migrated to the second node for operating on the second hypervisor type, including migrating the converted virtual machine from the second node back to the first node.

24. The non-transitory computer readable media of claim 22, wherein the hypervisor conversion for a last node comprises:

converting the hypervisor on the last node from the first hypervisor type to the second hypervisor type; and migrating the converted virtual machine from the first node back to the last node.

* * * * *